United States Patent
Wang et al.

(10) Patent No.: US 11,632,696 B2
(45) Date of Patent: Apr. 18, 2023

(54) MOBILITY HANDLING FOR MULTI-ACCESS PROTOCOL DATA UNIT (PDU) SESSIONS IN A 5G NETWORK

(71) Applicant: IDAC Holdings, Inc., Wilmington, DE (US)

(72) Inventors: Guanzhou Wang, Brossard (CA); Saad Ahmad, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 49 days.

(21) Appl. No.: 16/968,702

(22) PCT Filed: Feb. 15, 2019

(86) PCT No.: PCT/US2019/018267
§ 371 (c)(1),
(2) Date: Aug. 10, 2020

(87) PCT Pub. No.: WO2019/161240
PCT Pub. Date: Aug. 22, 2019

(65) Prior Publication Data
US 2021/0014742 A1    Jan. 14, 2021

Related U.S. Application Data

(60) Provisional application No. 62/791,428, filed on Jan. 11, 2019, provisional application No. 62/652,457, (Continued)

(51) Int. Cl.
*H04W 4/00* (2018.01)
*H04W 36/00* (2009.01)
*H04W 36/14* (2009.01)

(52) U.S. Cl.
CPC ....... *H04W 36/0027* (2013.01); *H04W 36/14* (2013.01)

(58) Field of Classification Search
CPC . H04W 28/00; H04W 28/02; H04W 36/0011; H04W 36/0016; H04W 36/0022;
(Continued)

(56) References Cited

FOREIGN PATENT DOCUMENTS

| EP | 3293910 A1 | 3/2018 |
|---|---|---|
| WO | WO 2013143613 A1 | 10/2013 |

OTHER PUBLICATIONS

3GPP TS 23.502 V15.0.0 (Dec. 2017) Technical Specification, 3rd Generation Partnership Project; Technical Specification Group Services and System Aspects; Procedures for the 5G System; Stage 2 (Release 15), 258 pages.

(Continued)

*Primary Examiner* — Matthew W Genack
(74) *Attorney, Agent, or Firm* — Jerome G. Schaefer

(57) ABSTRACT

Methods, apparatuses, systems, etc. for handling mobility in connection with protocol data unit (PDU) sessions are provided. Among these is a wireless transmit/receive unit (WTRU) that may receive, from a source access network (S-AN), a handover command in connection with a handover involving a multi-access protocol PDU (MA-PDU) session having one of first and second access legs associated with the S-AN. The WTRU may determine that the second access leg should be associated to the S-AN for the handover. The WTRU may send a session modification message to request modification of the MA-PDU session to cause the second access leg to become associated with S-AN The WTRU may establish a radio resource control connection with a target AN (T-AN), and the first and second access legs (e.g., as a combined access leg) may be associated with the T-AN.

17 Claims, 13 Drawing Sheets

Related U.S. Application Data filed on Apr. 4, 2018, provisional application No. 62/710,429, filed on Feb. 16, 2018.

(58) Field of Classification Search
CPC ......... H04W 36/0027; H04W 36/0033; H04W 36/0066; H04W 36/0069; H04W 36/14; H04W 36/16; H04W 40/00; H04W 40/02; H04W 40/04; H04W 40/34; H04W 40/36; H04W 60/00; H04W 60/005; H04W 64/00; H04W 76/00; H04W 76/10; H04W 76/15; H04W 80/10

See application file for complete search history.

(56) References Cited

OTHER PUBLICATIONS

Nokia et al., "Inter-eNB HO without WT change—solution considerations", 3GPP Draft Tdoc R3-161068; 3GPP TSG-RAN WG3 Meeting #92; Nanjing, P.R.China., May 23-27, 2016, 7 pages.

3GPP TS 23.501 V15.0.0 (Dec. 2017), 3rd Generation Partnership Project; Technical Specification Group Services and System Aspects; System Architecture for the 5G System; Stage 2 (Release 15), 181 pages.

3GPP TS 24.501 VO.3.1 (Feb. 2018), 3rd Generation Partnership Project; Technical Specification Group Core Network and Terminals; Non-Access-Stratum (NAS) protocol for 5G System (5GS); Stage 3 (Release 15), 242 pages.

3GPP TS 38.300 V2.0.0 (Dec. 2017), 3rd Generation Partnership Project; Technical Specification Group Radio Access Network; NR; NR and NG-RAN Overall Description; Stage 2 (Release 15) 68 pages.

MOBILITY HANDLING FOR MULTI-ACCESS PROTOCOL DATA UNIT (PDU) SESSIONS IN A 5G NETWORK

CROSS REFERENCE TO RELATED APPLICATIONS

This application is a U.S. National Stage Application under 35 U.S.C. § 371 of International Application PCT/US2019/018267, filed Feb. 15, 2019, which claims the benefit of U.S. Provisional Patent Applications 62/791,428, filed Jan. 11, 2019, 62/652,457 filed Apr. 4, 2018, and 62/710,429 filed Feb. 16, 2018.

FIELD

The present disclosure relates to network communications, including, but not exclusively, to managing or otherwise handling mobility (e.g., handover, session continuity, etc.) in connection with protocol data unit (PDU) sessions.

BACKGROUND

Fifth generation (5G) networks may support both single-access protocol data unit (SA-PDU) and multi-access protocol data unit (MA-PDU) sessions. The MA-PDU and (SA-PDU) sessions are alike in many aspects. However, traffic of the MA-PDU session may traverse multiple access networks (e.g., via separate legs of the MA-PDU session). Solutions are needed for managing or otherwise handling mobility (e.g., handover, session continuity, etc.) in connection with MA-PDU sessions, including those in which the multiple access networks include an access network in accordance with (e.g., in compliance with) access-network protocols promulgated by the Third Generation Partnership Project (3GPP) ("3GPP access network") and an access network other than a 3GPP access network ("non-3GPP access network").

SUMMARY

Exemplary embodiments relate to managing or otherwise handling mobility (e.g., handover, session continuity, etc.) in connection with protocol data unit (PDU) sessions, such as, for example, a handover involving a multi-access PDU (MA-PDU) session. The term "exemplary" is used herein to mean "serving as an example, instance, or illustration." Any embodiment described herein as "exemplary" is not necessarily to be construed as preferred or advantageous over other embodiments.

Embodiments of the WTRU may include one or more of the following features, alone or in any combination. In an embodiment, a wireless transmit/receive unit (WTRU) may receive, from a source access network (S-AN), a handover command in connection with a handover involving a MA-PDU session. The MA-PDU session may include a first access leg that is associated with the S-AN and a second access leg that is not associated with the S-AN. The WTRU may determine to associate the second access leg to the S-AN for the handover. The WTRU may send, to or toward the S-AN, a session modification message to request, instruct and/or cause modification of the MA-PDU session to associate the second access leg to the S-AN for the handover. The WTRU may establish a radio resource control (RRC) connection with a target access network (T-AN), and the first and second access legs are associated with the T-AN.

In an embodiment, a WTRU may receive, from a S-AN, a handover command in connection with a handover involving a MA-PDU session. The MA-PDU session may include a first access leg that is associated with the S-AN and a second access leg that is not associated with the S-AN. The WTRU may determine whether to associate the second access leg to the S-AN for the handover. On condition that the determination is to associate the second access leg to the S-AN for the handover, the WTRU may send a session modification message to request, instruct and/or cause the second access leg to become associated with the S-AN for the handover. The session modification message may be, for example, a session modification message that requests, instructs and/or causes modification of the MA-PDU session to combine the first and second access legs into a combined access leg for the handover. The WTRU may establish an RRC connection with a T-AN, and the combined access leg may be associated with the T-AN.

On condition that the determination is not to associate the second leg to the S-AN for the handover, the WTRU may maintain the second leg; establish an RRC connection with the T-AN, where the first access leg is associated with the T-AN; and send, to the T-AN, an RRC reconfiguration message to request, instruct and/or cause the second access leg to become associated with the T-AN. The RRC reconfiguration message may be, for example, an RRC reconfiguration message that requests, instructs and/or causes modification of the MA-PDU session to combine the second access leg with the first access leg into a combined access leg associated with the T-AN.

The determination of whether to associate the second access leg to the S-AN may be, or part of, a determination of whether to request modification of the MA-PDU session to combine the first and second access legs into a combined access leg for the handover. For example, the WTRU may determine whether to associate the second access leg to the S-AN by determining whether to request, instruct and/or cause modification of the MA-PDU session to combine the first and second access legs into a combined access leg for the handover. Alternatively, the WTRU may determine whether to associate the second access leg to the S-AN in connection with determining whether to request, instruct and/or cause modification of the MA-PDU session to combine the first and second access legs into a combined access leg for the handover.

The session modification message may include any of one or more identifiers for, or of, the MA-PDU session, a requested action, and a direction of association change/switch. The session modification message may include and/or indicate (explicitly and/or implicitly) any of one or more identifiers for, or of, the MA-PDU session, a requested action, and a direction of association change/switch. the session modification message, for example, may include and/or explicitly indicate (e.g., include information indicating) any of one or more identifiers for, or of, the MA-PDU session, a requested action, and a direction of association change/switch. Alternatively, the session modification message may implicitly indicate any of one or more session identifiers for, or of, the MA-PDU session, a requested action and a direction of association change/switch (e.g., using a particular type of session modification message). The session modification message (e.g., a particular type of session modification message) may include (or explicitly indicate) and implicitly indicate any two or more of one or more session identifiers for, or of, the MA-PDU session, a requested action and a direction of association change/switch.

The session modification message may include any of an internet protocol (IP) tuple for a data flow of the second access leg, a packet filter for a data flow of the second access leg, and a quality of service flow identifier (QFI) of a data flow of the second access leg. The session modification message may include and/or indicate (explicitly and/or implicitly) any of IP tuple for a data flow of the second access leg, a packet filter for a data flow of the second access leg, and a QFI of a data flow of the second access leg. The session modification message, for example, may include and/or explicitly indicate (e.g., include information indicating) any of an IP tuple for a data flow of the second access leg, a packet filter for a data flow of the second access leg, and a QFI of a data flow of the second access leg. Alternatively, the session modification message may implicitly indicate any of an IP tuple for a data flow of the second access leg, a packet filter for a data flow of the second access leg, and a QFI of a data flow of the second access leg (e.g., using a particular type of session modification message). The session modification message (e.g., a particular type of session modification message) may include (or explicitly indicate) and implicitly indicate any two or more of an IP tuple for a data flow of the second access leg, a packet filter for a data flow of the second access leg, and a QFI of a data flow of the second access leg. The WTRU may receive a confirmation to the session modification message.

The WTRU may receive, via the T-AN, traffic of the combined access leg buffered at the S-AN. The WTRU may request, instruct and/or cause ("request/instruct/cause") a redirection of traffic from the second access leg to the first access leg which is requested, instructed and/or accomplished ("requested/instructed/accomplished") before a handover to the T-AN is completed.

In an embodiment, a WTRU may establish a RRC connection with a T-AN in connection with handover execution of a handover involving a MA-PDU session. The MA-PDU session may include a first access leg associated with the T-AN and a second access leg not associated with the T-AN. The WTRU may determine whether to associate the second access leg to the T-AN. The determination of whether to associate the second access leg to the T-AN may be, or part of, a determination of whether to request modification of the MA-PDU session to combine the first and second access legs into a combined access leg. Alternatively, the determination of whether to associate the second access leg to the T-AN may be, or part of, a determination of whether to request modification of the MA-PDU session to path switch only one of the first and second access legs. The WTRU may send an RRC reconfiguration message to request modification of the MA-PDU session to combine the second access leg with the first access leg. Alternately, the WTRU may send an RRC reconfiguration message to request modification of the MA-PDU session to path switch only one of the first and second access legs.

The WTRU may indicate in the RRC reconfiguration message, a complete path switch of the first access leg and the second access leg of the MA-PDU session to the T-AN. The WTRU may indicate in the RRC reconfiguration message a partial path switch of only one of the first access leg or the second access leg to the T-AN.

Exemplary embodiments may include methods relating to managing or otherwise handling mobility (e.g., handover, session continuity, etc.) in connection with PDU sessions, such as, for example, a handover involving a MA-PDU session. Embodiments of the method may include one or more of the following features, alone or in any combination.

In an embodiments, a method performed by (and/or implemented in) a WTRU may include receiving, from a S-AN, a handover command in connection with a handover involving a MA-PDU session, wherein the MA-PDU session may include first and second access legs, wherein the first access leg is associated with the S-AN, and wherein the second access leg is not associated with the S-AN. The method may include determining whether to associate the second access leg to the S-AN for the handover. In a representative embodiment of a method, on condition that a determination is to request, or instruct, or cause modification of the MA-PDU session to combine the first and second access legs into a combined access leg for the handover, the method may include sending a session modification message to request, or instruct, or cause modification of the MA-PDU session to combine the first and second access legs into a combined access leg for the handover. The method may include establishing a RRC connection with a T-AN, and the combined access leg is associated with the T-AN.

In an embodiment, sending a session modification message may include sending one or more of identifiers for the MA-PDU session, a requested action for the MA-PDU session, and a direction of association change/switch.

In an embodiment, a method (e.g., implemented in a WTRU) may include establishing a RRC connection with a T-AN in connection with handover execution of a involving a MA-PDU session. The MA-PDU session may include a first access leg is associated with the T-AN and a second access leg not associated with the T-AN. The method may include determining whether to request, instruct, and/or cause modification of the MA-PDU session to combine the first access leg and the second access leg into a combined access leg. Alternately, the method may include determining whether to request, instruct, and/or cause modification of the MA-PDU session to path switch only one of the first and second access legs. The method may include sending an RRC reconfiguration message to request, or instruct, and/or cause modification of the MA-PDU session to combine the second access leg with the first access leg. Alternately, the method may include determining whether to request, instruct, and/or cause modification of the MA-PDU session to path switch only one of the first and second access legs.

In an embodiment, sending a RRC reconfiguration message to the T-AN may include sending a complete path switch of the first access leg and the second access leg of the MA-PDU session to the target access network. Alternatively, sending a RRC reconfiguration message to the T-AN may include sending a partial path switch of only one of the first access leg or the second access leg to the target access network.

In an embodiment, a method, which may be performed by (or implemented in) a core network function, such as a target access and mobility management function (T-AMF), may include receiving PDU session information in connection with a handover of any of a SA-PDU session and a first leg of a multi-access PDU (MA-PDU) session from a S-AN to a T-AN. The PDU session information indicates information associated with an access serving a second leg of the MA-PDU session, wherein the second leg of the MA-PDU session does not utilize the S-AN. The method may include sending, to a session management function (SMF), a first session modification request to cause, or request, or instruct modification of session management contexts associated with the SA-PDU session and the first leg of the MA-PDU session utilizing context information associated with a temporary PDU session and the second leg of the MA-PDU session, respectively. The method may include receiving a notification of handover confirmation, and sending, to the SMF, a second session modification request to cause, or request, and/or instruct modification of session management contexts associated with a handed-over SA-PDU session and a handed-over first leg of the MA-PDU session using respective contexts assigned to the handed-over SA-PDU session and the handed-over first leg of the MA-PDU session in the T-AN.

The method may (e.g., may also) include determining, based, at least in part, on the PDU session information, to cause, or request, and/or instruct that traffic associated with the first leg of the MA-PDU session to traverse the second leg of the MA-PDU session, and traffic associated with the SA-PDU session to traverse the temporary PDU session established at an access serving the second leg of the MA-PDU session.

The method may (e.g., may also) include determining, based at least in part, on the notification of handover confirmation, to cause, or request, and/or instruct traffic associated with the first leg of the MA-PDU session to traverse the T-AN instead of the second leg of the MA-PDU session, and traffic associated with the SA-PDU session to traverse the T-AN instead of the temporary PDU session.

The method may (e.g., may also) include sending, to the access serving the second leg of the MA-PDU session, a PDU session message to cause creation of the temporary PDU session as a proxy for the SA-PDU session. The method may (e.g., may also) include sending, to the access serving the second leg of the MA-PDU session, another PDU session message to cause, or request, and/or instruct release of the temporary PDU session. The method may (e.g., may also) include receiving a transport address associated with the access serving the second leg of the MA-PDU session. The method may (e.g., may also) include sending a transport address associated with the access serving the second leg of the MA-PDU session. The method may include sending a transport address associated with the T-AN.

The method may (e.g., may also) include receiving information for triggering the sending of the first session modification request. This may include receiving an acknowledgement of handover request from the T-AN. The method may (e.g., may also) include sending a handover request to transfer the MA-PDU session and the SA-PDU session from the S-AN to the T-AN before receiving the acknowledgement of the handover request. The method may (e.g., may also) include receiving the PDU session information that indicates information associated with a non-Third Generation Partnership Project (non-3GPP) access having an associated interworking function.

A computer program product may be provided including instructions which when executed by a computer cause the computer to carry out at least part of any of the methods described above. For example, a computer program product may take the form of a computer readable storage medium.

In an embodiment an apparatus, such as a WTRU, may receive, from a source access and mobility management function (S-AMF), PDU session information in connection with a handover of any of a SA-PDU session and a first leg of a multi-access PDU (MA-PDU) session from a S-AN to a T-AN. The PDU session information indicates information associated with an access serving a second leg of the MA-PDU session, wherein the second leg of the MA-PDU session does not utilize the S-AN. The apparatus may send, to a SMF, a first session modification request to cause, or instruct, and/or request modification of session management contexts associated with the SA-PDU session and the first leg of a MA-PDU session utilizing context information associated with a temporary PDU session and the second leg of the MA-PDU session, respectively. The apparatus may receive a notification of handover confirmation, and send, to the SMF, a second session modification request to cause, or instruct, and/or request modification of session management contexts associated with a handed-over SA-PDU session and a handed-over first leg of the MA-PDU session using respective contexts assigned to the handed-over SA-PDU session and the handed-over first leg of the MA-PDU session in the T-AN.

The apparatus may (e.g., may also) determine, based, at least in part, on the PDU session information, to cause, or instruct, and/or request traffic associated with the first leg of the MA-PDU session to traverse the second leg of the MA-PDU session, and traffic associated with the SA-PDU session to traverse the temporary PDU session established at an access serving the second leg of the MA-PDU session.

The apparatus may (e.g., may also) determine, based at least in part, on the notification of handover confirmation, to cause, or instruct, and/or request traffic associated with the first leg of the MA-PDU session to traverse the T-AN instead of the second leg of the MA-PDU session, and traffic associated with the SA-PDU session to traverse the T-AN instead of the temporary PDU session. The apparatus may also send, to the access serving the second leg of the MA-PDU session, a PDU session message to cause, or instruct, and/or request creation of the temporary PDU session as a proxy for the SA-PDU session. The apparatus may (e.g., may also) send, to the access serving the second leg of the MA-PDU session, another PDU session message to cause, and/or instruct, and/or request release of the temporary PDU session. The information associated with the access serving the second leg of the MA-PDU session may include a transport address. The context information associated with the temporary PDU session and the second leg of the MA-PDU session may include a transport address associated with the access serving the second leg of the MA-PDU session. The contexts assigned to the SA-PDU session and the first leg of a MA-PDU session in the T-AN may include a transport address associated with the T-AN.

The apparatus may (e.g., may also) receive information that triggers the sending of the first session modification request. The information that triggers the sending of the first session modification request may include an acknowledgement of handover request from the T-AN. The apparatus may (e.g., may also) send a handover request to transfer the MA-PDU session and the SA-PDU session from the S-AN to the T-AN before receipt of the acknowledgement of a handover request. The access serving the second leg of the MA-PDU session may be a non-Third Generation Partnership Project (non-3GPP) access having an associated interworking function. The apparatus may be a target access and mobility management function (T-AMF).

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
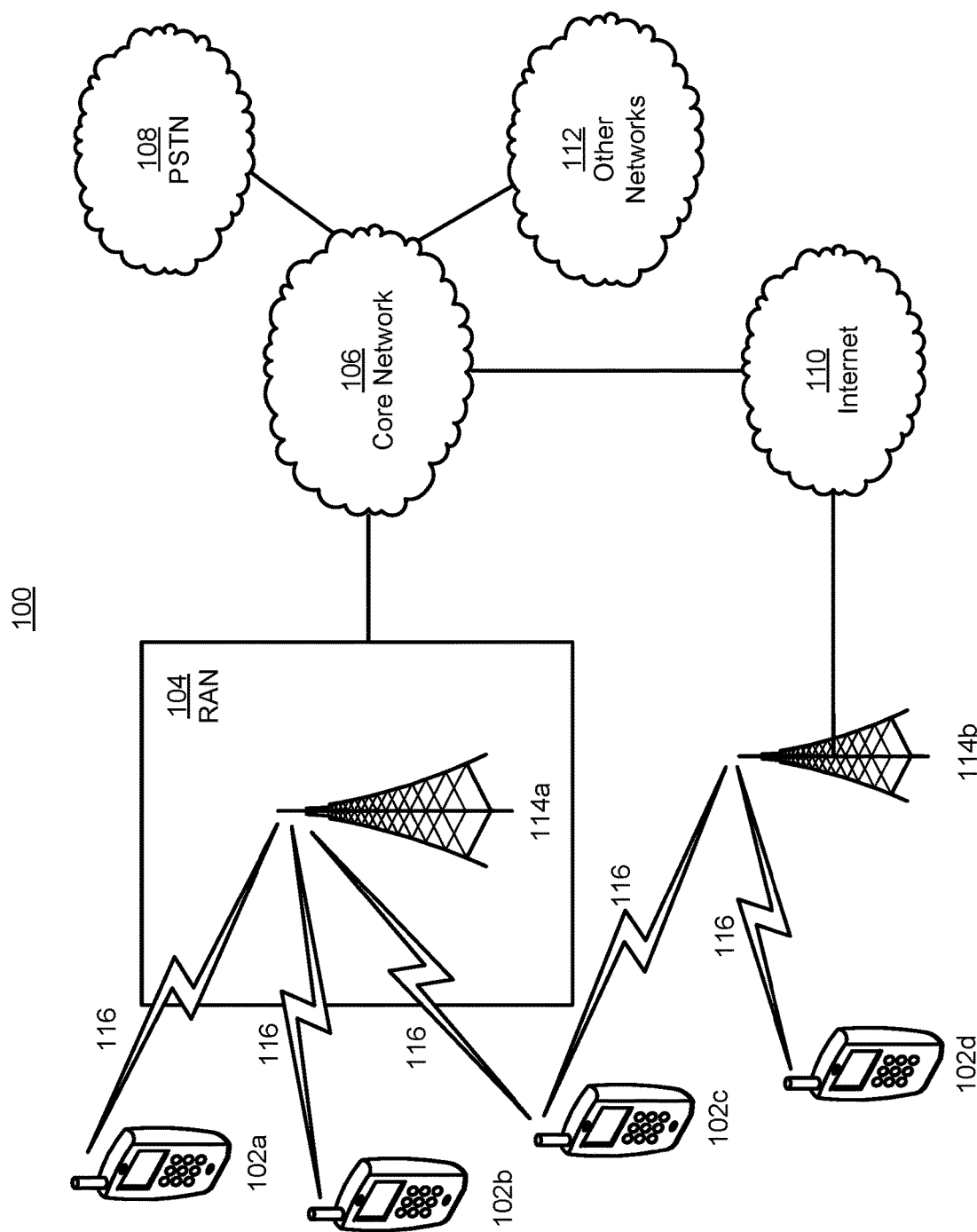
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the IP in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
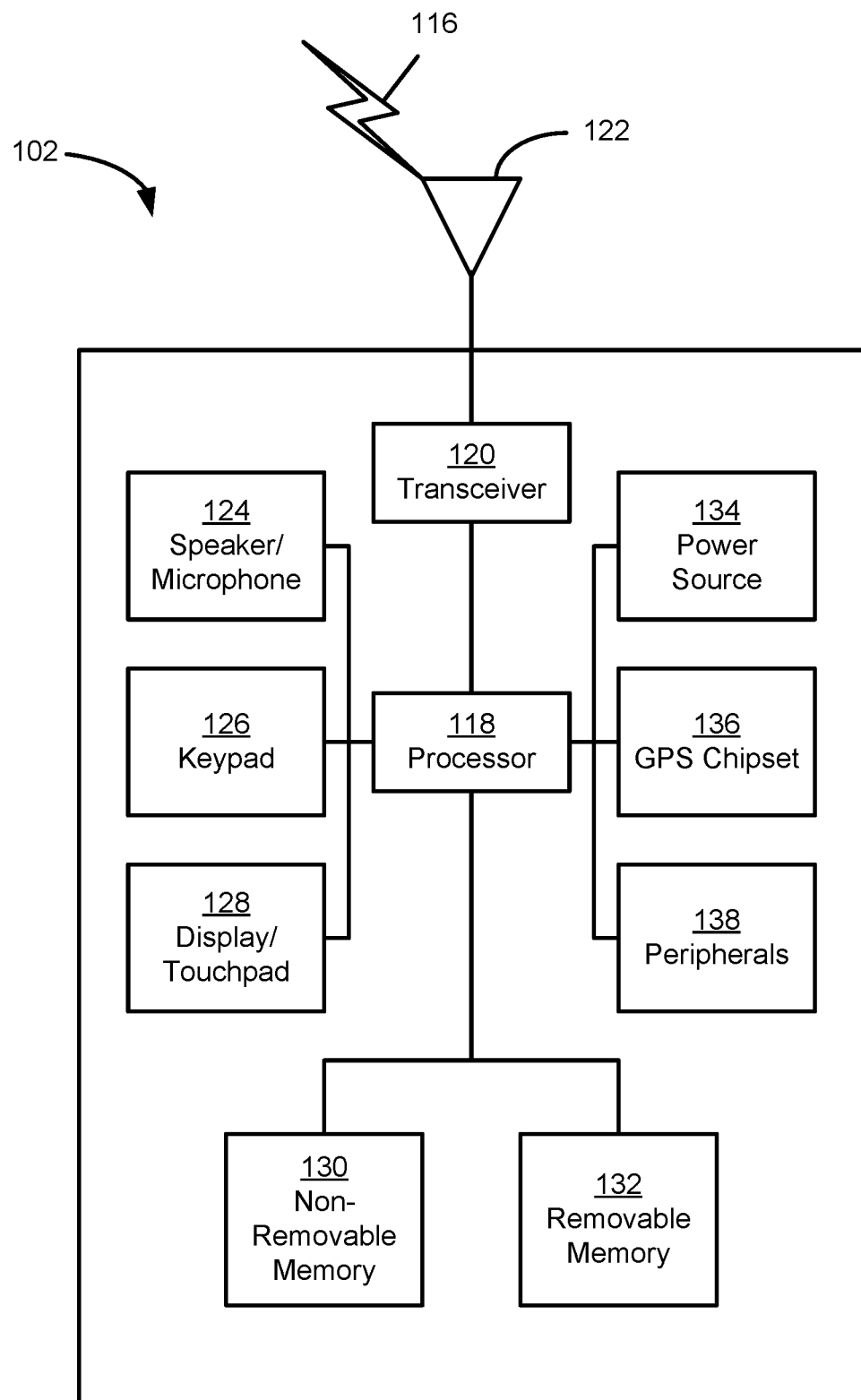
FIG. 1B is a system diagram illustrating an example WTRU that may be used within the communications system illustrated in FIG. 1A according to an embodiment.
Figure 1C:
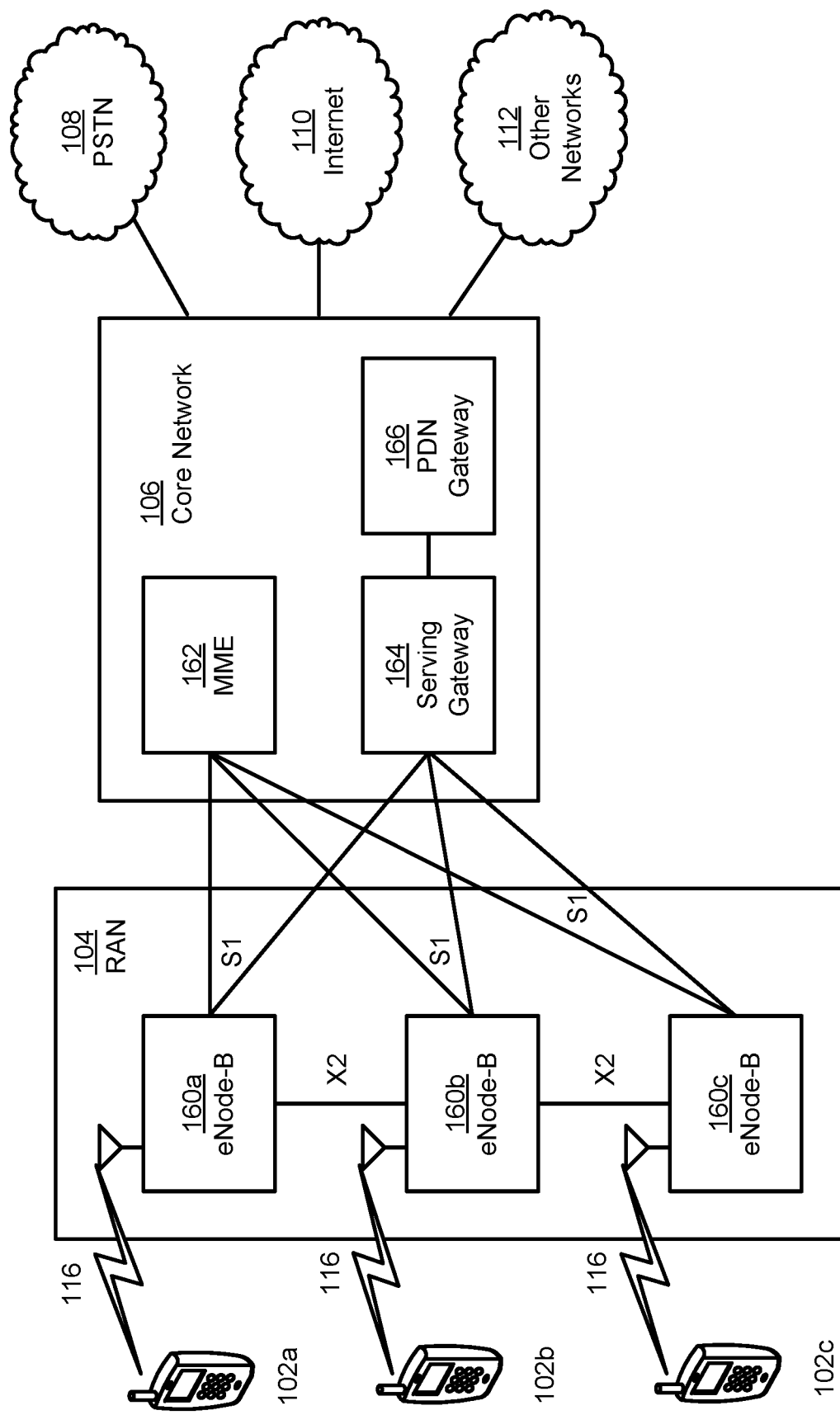
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
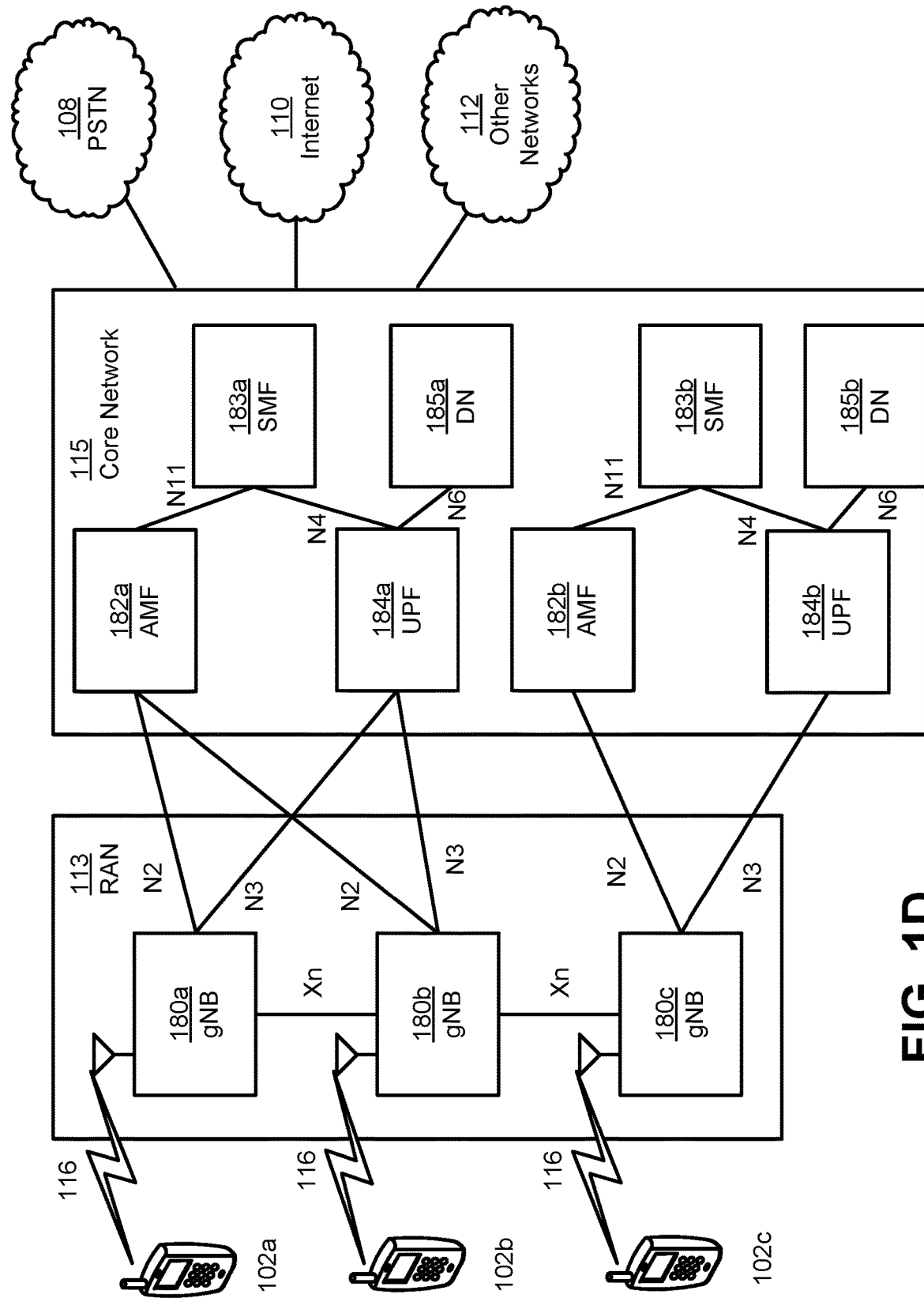
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of (non-access stratum) (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

In a 5G Network (e.g., Next Generation (NG)), a single PDU session may be established over multiple types of access networks (referred to herein as a "multi-access PDU session" or the abbreviation "MA-PDU"). A MA-PDU session may be established, for example, over both (e.g., simultaneously) a 3GPP access network (3GPP AN) and a non-3GPP AN.

A non-3GPP AN may be connected to the 5G core network via a non-3GPP Interworking Function (N3IWF). N2 and N3 reference points may connect (e.g., standalone) non-3GPP accesses to 5G core network control-plane and user-plane functions, respectively. A WTRU that accesses the 5G core network over a standalone non-3GPP access may (e.g., after WTRU attachment) support Non-Access Stratum (NAS) signaling with 5G core network control-plane functions using an N1 reference point.

Figure 2:
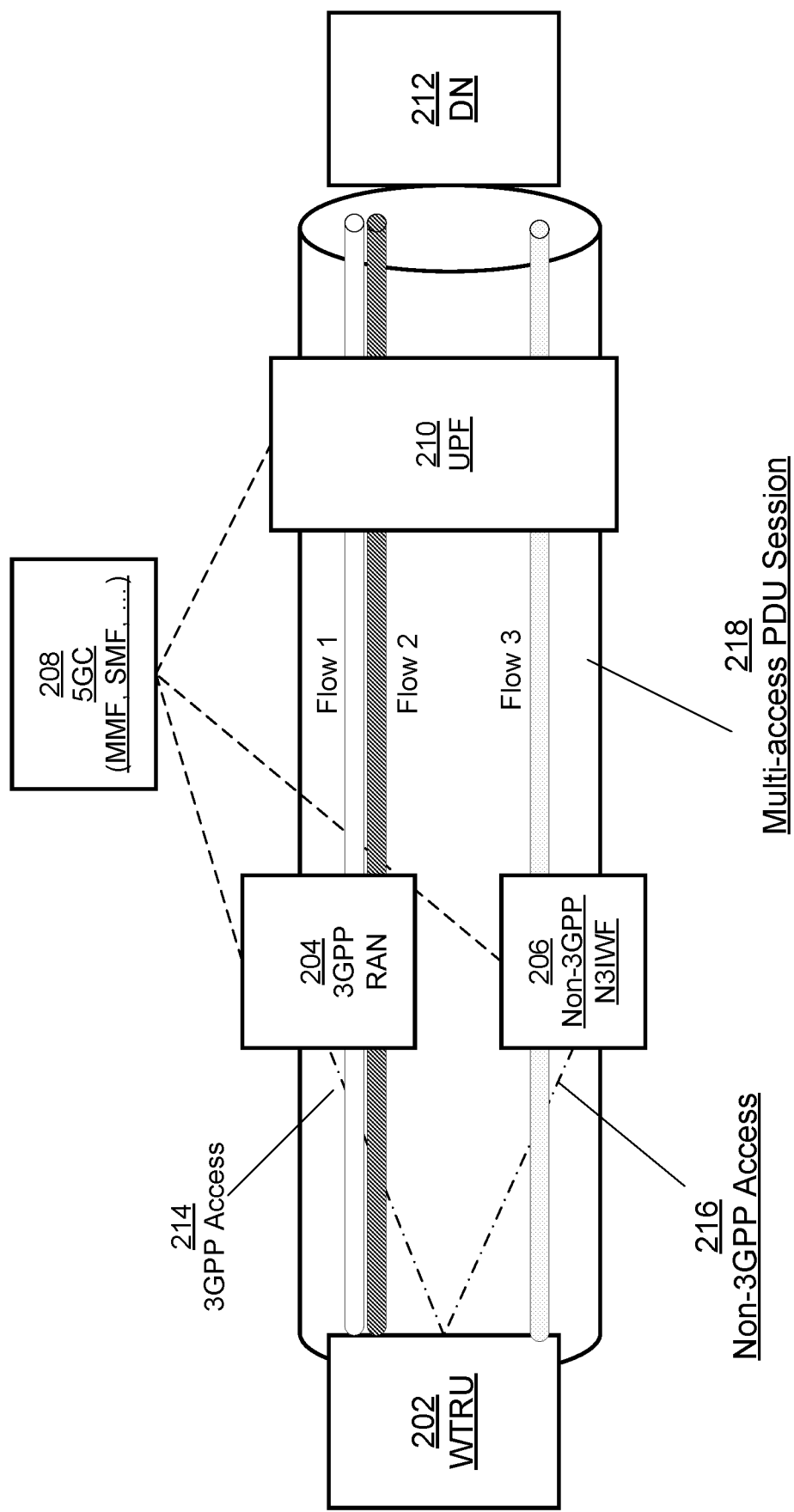
FIG. 2 depicts an example PDU session over both 3GPP ANs and non-3GPP ANs.

FIG. 2 depicts an example MA-PDU session 218, over both 3GPP (214) and non-3GPP access networks (AN) 216. As shown, data flows of the MA-PDU session between a WTRU 202 to a destination node 212 may be distributed between the 3GPP AN and non-3GPP AN (e.g., according to the traffic steering policy rules or network/WTRU decisions). In an example, the data may be split between two access legs in terms of IP flows. For example, in FIG. 2, IP Flow 1 (and/or IP Flow 2) may be carried over the 3GPP access, while IP Flow 3 may be carried over the non-3GPP access. In an example, the data may be split in terms of QoS flows, for example, data flows of a first QoS flow ID may be carried over the 3GPP access while data flows of a second QoS flow ID may be carried over the non-3GPP access. The WTRU may access the 3GPP Radio access network (RAN) 204 to utilize the 5G Core functions such as described in conjunction with FIG. 1D. The WTRU may access the Non-3GPP N3IWF 206 to receive IP flow 3. In the flow instances shown in FIG. 2, the UPF 210 assists in directing the various IP flows.

An Xn-based Inter-Next Generation (NG)-Random Access Network (RAN) (Inter-NG-RAN) handover (e.g., without Access and Mobility Management Function (AMF) relocation) for a multi-access PDU session may be implemented.

Figure 3:
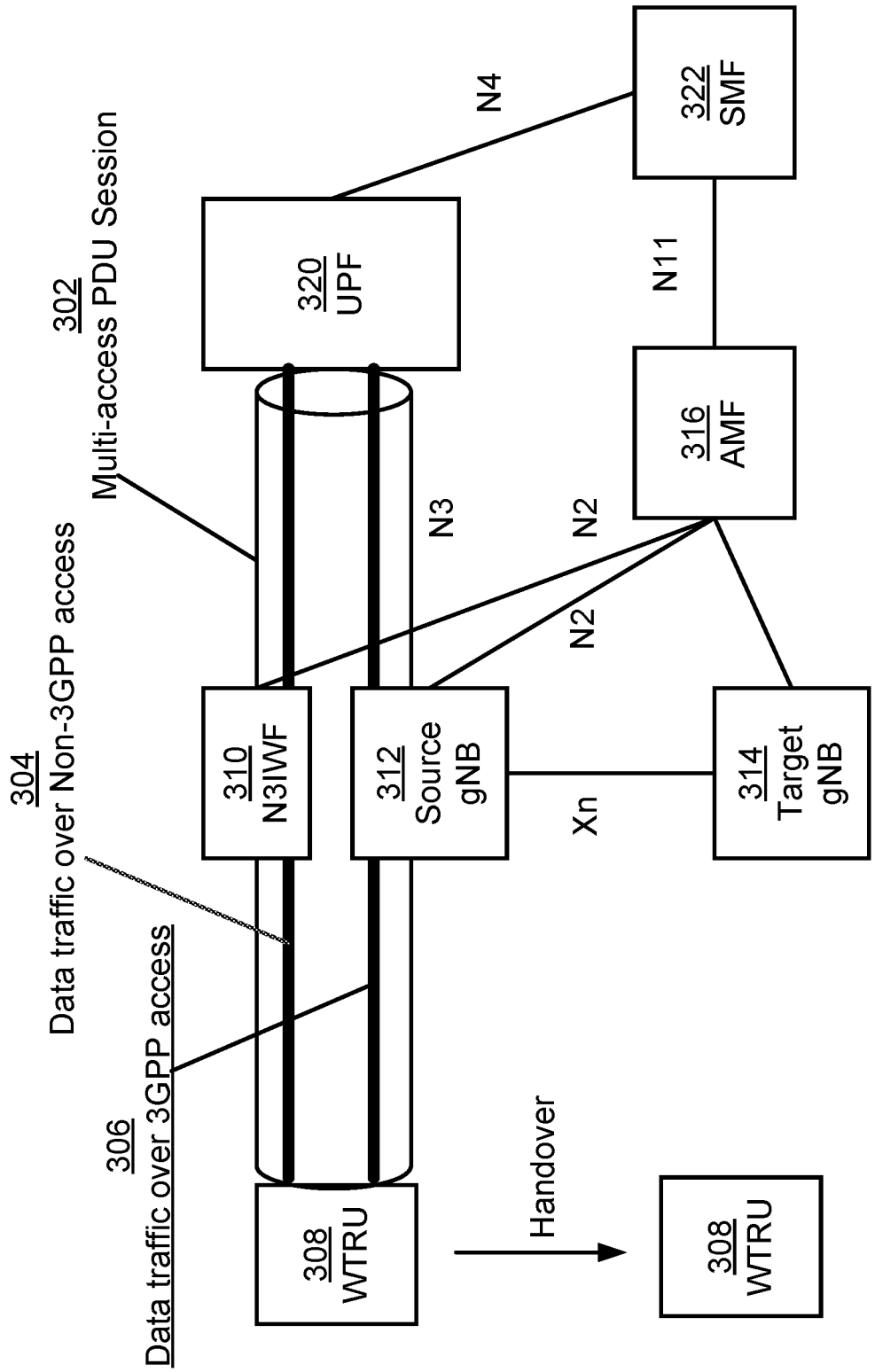
FIG. 3 depicts an example a Xn-based Inter-NG-RAN handover for a multi-access PDU session.

FIG. 3 depicts an example a Xn-based Inter-NG-RAN handover for a multi-access PDU (MA-PDU) session 302. If a WTRU 308 has an active multi-access PDU session 302 when a handover in a 3GPP AN occurs, certain issues may be addressed. For example, the data traffic 306 on the 3GPP RAN (e.g., only) may be subject to handover procedure and/or the data traffic on the non-3GPP AN may also be impacted by the handover. In one example, a handover may occur upon movement of the WTRU 308 from source RAN equipment such as source gNB 312 to a target RAN equipment such as target gNB 314. In an example, the source RAN and the target RAN may not be aware that the PDU session involved in the handover is a multi-access PDU session. In an example, for a multi-access PDU session, the source RAN and the AMF may not be aware of how data traffic of the PDU session is distributed between the 3GPP RAN and the non-3GPP AN, thus the source RAN may not be able to request sufficient source reservation at the target RAN (e.g., if some additional traffic needs to be switched from the non-3GPP AN to the target RAN due to the handover). In an example, when the target RAN initiates a path switch, the data traffic of two or more legs of the multi-access PDU session may be switched to the target RAN (e.g., which may not be prepared to accept the additional data traffic that was previously distributed to the non-3GPP access). Other equipment that may be involved in such a handover may include SMF 322 and UPF 320.

Figure 4:
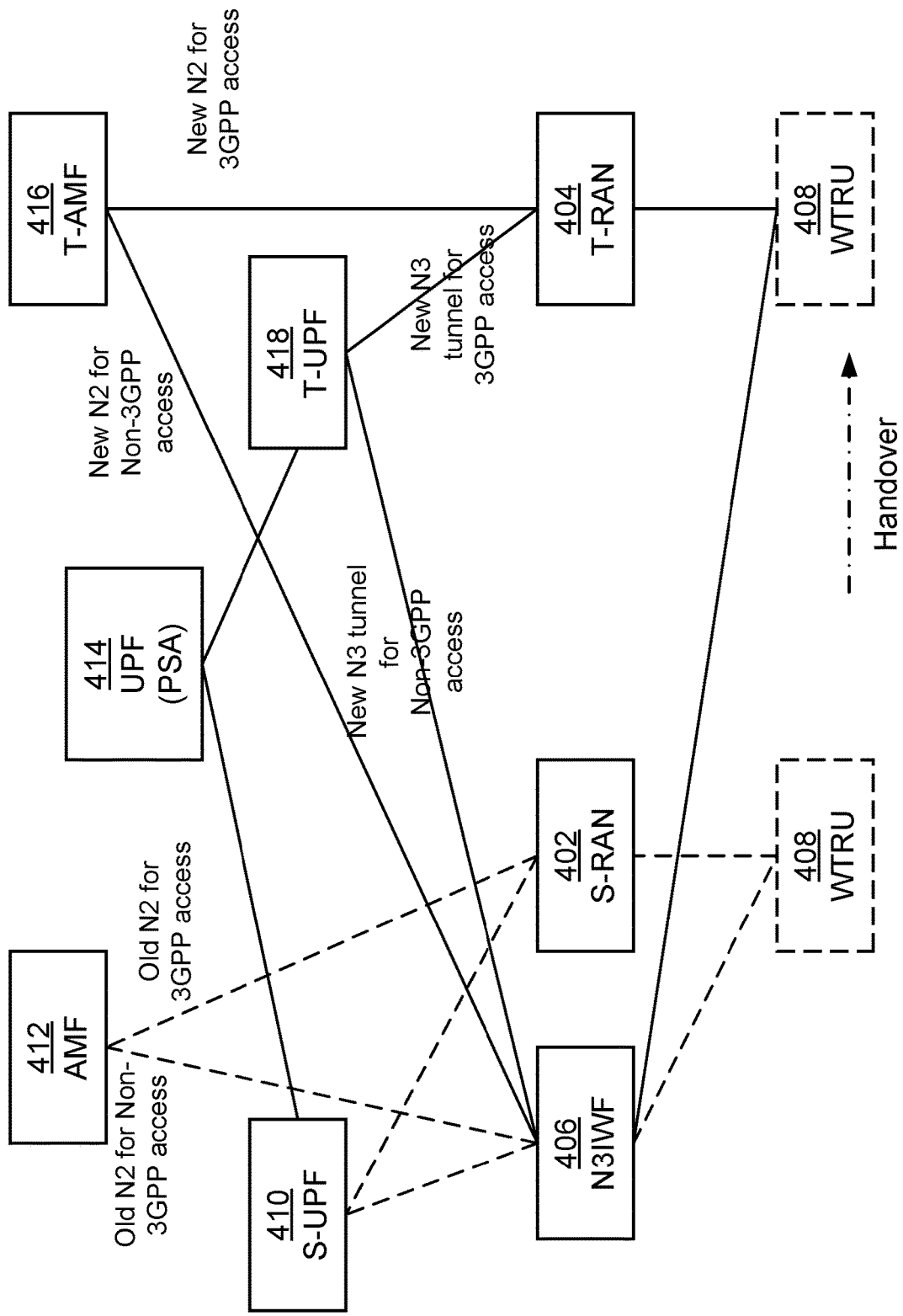
FIG. 4 depicts an example N2-based handover with Access and Mobility Management Function (AMF) relocation for a multi-access PDU session.

FIG. 4 depicts an example of N2-based handover with AMF relocation for a multi-access PDU session. An N2-based Inter-NG-RAN handover (with AMF relocation) for a multi-access PDU session may be implemented.

A WTRU 408 which has an active multi-access PDU session using a source RAN 402 may be handed-over (e.g., over 3GPP access) to a new serving target RAN 404. The serving AMF 412 may be changed (e.g., relocated) during the handover. Also, a source UPF 410 may be relocated to a target UPF 418. If handover occurs, the RAN node, a core network node, and/or a WTRU may be configured to perform one or more actions relating to handing over a multi-access PDU session. For example, the target AMF (T-AMF) 416 may be informed (e.g., procedures may be implemented to inform the T-AMF) that multi-access PDU sessions are involved in a handover. Detailed information about the non-3GPP access portion of the PDU sessions may be provided to the T-AMF (e.g., so the PDU session may be properly handled), and determinations regarding the level of detail may be made. In an example, handover may occur on the 3GPP access side, but the user plane path on the non-3GPP access (between N3IWF 406 and intermediate UPF) may be switched/updated also (e.g., if the intermediate UPF is re-allocated for the handover). Procedures may be implemented to trigger the UP path switch on the N3IWF. In an example, with a change of the serving AMF, the N2 connection between the N3IWF 406 and the old AMF 412 may be moved over to the new T-AMF 416. For the 3GPP access, the N2 connection switch due to RAN handover may be triggered by a Handover Required message. For the non-3GPP access (e.g., N3IWF) in the example handover, the N3IWF may not be aware a handover may be happening. Methods may be implemented to trigger the N2 connection switch. In an example, the WTRU may be assigned a new temporary ID after handover. For a N3IWF, information (e.g., WTRU context, security association, N2 connection, etc.) may be associated with WTRU temporary ID. Methods may be implemented to synchronize a new WTRU ID on the non-3GPP access.

During handover, a WTRU may be configured to switch all data traffic to one access and/or the WTRU may request, instruct and/or cause two or more access legs of MA-PDU session to become associated with, collapsed onto, and/or combined into a combined access leg for, a single AN (e.g., if the WTRU has an MA-PDU session when a handover occurs). For example, the WTRU may initiate the data traffic switching for the multi-access PDU session from one access (e.g., non-3GPP access) to the other access (e.g., 3GPP access) before accessing the target 3GPP RAN.

Upon receiving a handover command from the source RAN (e.g., if the WTRU has one or more active multi-access PDU sessions), the WTRU may initiate a NAS session management procedure (e.g., PDU session modification procedure) for the multi-access PDU session(s) to switch the data traffic from one access (e.g., non-3GPP access) to the other (e.g., 3GPP access).

A WTRU may indicate (e.g., in the NAS session management request message (e.g., PDU session modification request)) one or more of the PDU Session ID(s) in question, the requested action for the PDU session(s) (such as, for example, switching data traffic), and/or the direction of the switch (e.g., from non-3GPP access to the 3GPP access). In the session modification (SM) request message, the WTRU may (e.g., may also) specify the flows to be switched from one access (e.g., non-3GPP access) to the other (e.g., 3GPP access). The WTRU may specify the flows in one or more of the following: by specifying the packet filters (e.g., IP tuples) for the target data flows on the switch-from access (e.g., non-3GPP access); by specifying the QoS Flow IDs of the target data flows on the switch-from access (e.g., non-3GPP access); and/or by indicating all data flows on the switch-from access (e.g., non-3GPP access).

The WTRU may (e.g., may also) indicate the reason for the requested action, e.g., handover. The WTRU may send the SM request via the 3GPP access (e.g., the source RAN) and/or via the non-3GPP AN.

The WTRU may (e.g., after sending the SM request to switch the data traffic) stop sending UL traffic to the switch-from access (e.g., non-3GPP access) and may (e.g., instead) switch all UL traffic to the other access (e.g., 3GPP access). During the handover, the WTRU may disregard local routing/traffic steering policies that would direct the traffic to the switch-from access (e.g., non-3GPP access). In an example, the WTRU may continue to receive DL traffic from the switch-from access (e.g., non-3GPP access).

The WTRU may (e.g., after sending the SM request to switch the data traffic) wait for a confirmation response from the network before it resumes handover execution and/or starts accessing the target RAN. In another example, without waiting for a confirmation response, the WTRU may start accessing the target RAN.

The network (e.g., a SMF) may start switching data traffic from a first access (e.g., non-3GPP access) to another access (e.g., 3GPP access) for the concerned PDU session(s) upon receiving the WTRU's request. If the WTRU has indicated that the reason for the switching is a handover, the SMF may request the UPF to temporarily withhold the user plane traffic for the PDU sessions until the path switch request is received from the target RAN.

The AMF may receive the path switch request from the target RAN and invoke the SMF services to switch the user plane connection to the target RAN. The SMF may request the UPF(s) to resume the user plane transmission for the PDU sessions (e.g., if the user plane traffic for the PDU sessions was withheld before the path switch request). The SMF may indicate (e.g., via the AMF) to the target RAN the additional QoS flows (which may have been (e.g., previously) carried over the non-3GPP access) that may be supported (e.g., at the additional QoS flows). The WTRU may receive from the network (e.g., via the target RAN) a NAS response message corresponding to its previous SM request, for example, after the handover is over.

Figure 5A:
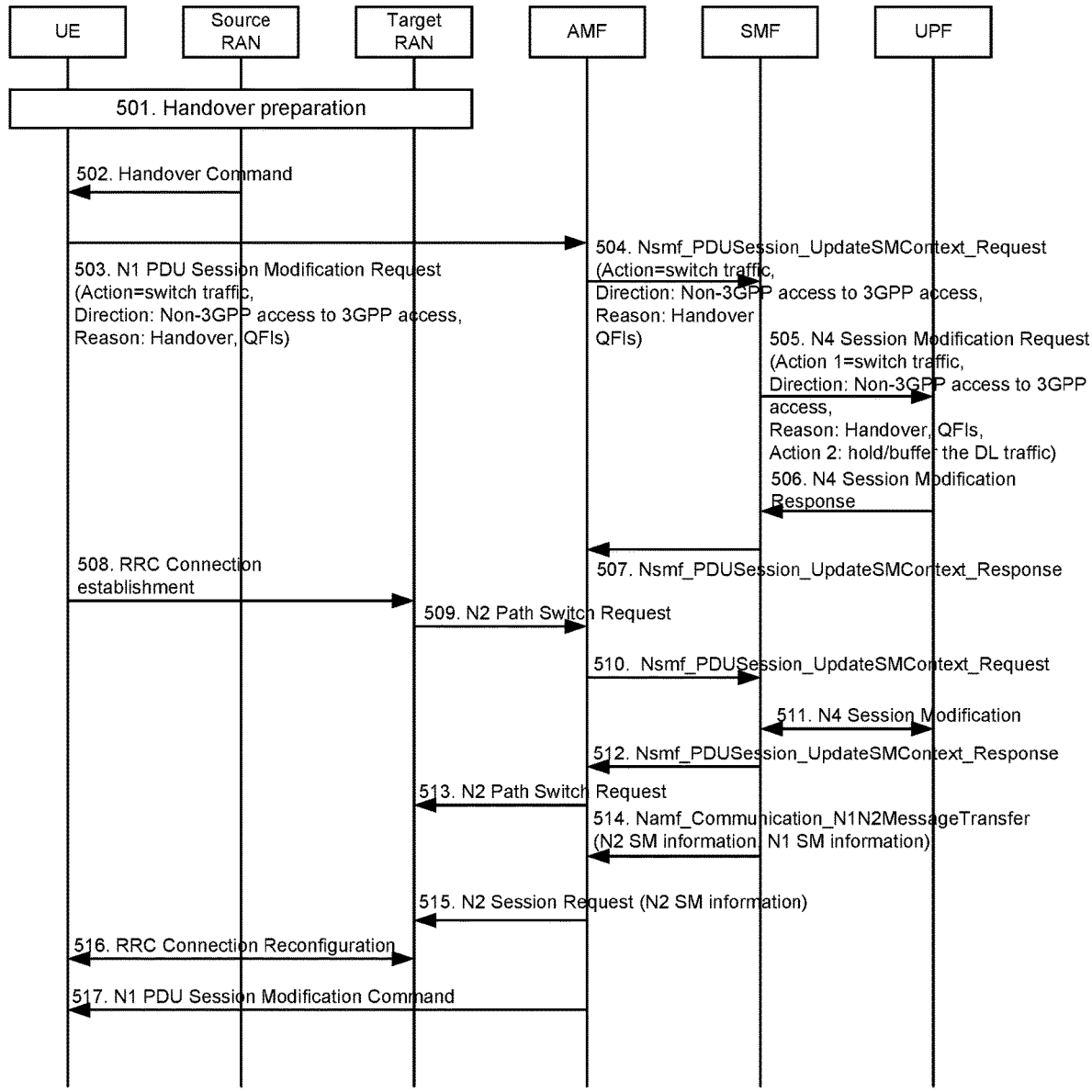
FIG. 5A depicts an example of switching all traffic to one access during handover.

FIG. 5A depicts an example of switching all traffic to one access (e.g., collapse to one combined access) during handover. Although not shown, the handover may be carried out or delineated into in multiple stages, such as, for example, handover preparation, handover execution and handover completion. For simplicity of exposition in FIG. 5A and the description that follows, ref. 501 may correspond to handover preparation, refs. 502-508 may correspond to handover execution, and refs. 509-517 may correspond to handover completion.

An Xn-based handover may be triggered. Handover preparation may be performed between the source RAN and the target RAN of FIG. 5A (ref 501). A WTRU may receive a handover command from the source RAN (ref. 502).

The WTRU may send a PDU session modification (SM) message to initiate or otherwise cause a PDU session modification request to the network (NW) (e.g., AMF) (ref. 503). In the PDU session management (PDU SM) (e.g., PDU SM request) message, the WTRU may indicate the desired action to switch the data traffic and the direction (e.g., from the non-3GPP access to the 3GPP access). In the PDU SM message, one or more QFIs concerning the second leg of the MA-PDU may be sent from the WTRU to the AMF. In an example, the PDU SM message may be sent over the 3GPP access. In an example, the PDU SM message may be sent over the non-3GPP access.

The AMF may invoke the SMF service to update the session context (ref. 504). The SMF may instruct the UPF to switch the data traffic (e.g., from the non-3GPP access to the 3GPP access) for the multi-access PDU session RAN (ref. 505). The SMF may (e.g., may also) instruct the UPF to hold/buffer the DL traffic (e.g., because the WTRU is performing a handover). The UPF updates the SMF context via response (ref. 506). The SMF may update the context response (ref. 507).

The WTRU may access the target RAN and may establish a RRC connection (ref. 508). The target RAN may initiate a N2 Path Switch request towards the AMF (ref. 509) The AMF may invoke the SMF service to switch the DL traffic to the target RAN (ref. 510). The SMF and UPF perform the session modification (ref. 511). The SMF may issue a session modification update in response (ref. 512). The AMF may produce a N2 path switch request to the target RAN (ref. 513). The SMF may invoke the AMF service to update the target RAN with the new N2 SM Information (e.g., which may include the new data flows switched from the non-3GPP access) (ref. 514). The AMF may send a N2 Session Request message to the target RAN (e.g., to update the target RAN with the new N2 SM information) (ref. 515) The target RAN may reconfigure the radio resources (e.g., Dedicated Radio Bearer (DRB) configuration) according to the new N2 SM Information (ref. 516). The AMF may forward the N1 PDU Session Modification Response message to the WTRU (ref. 517). The N1 PDU Session Modification Response message may serve as a confirmation to the PDU session modification request message (ref. 503).

Figure 5B:
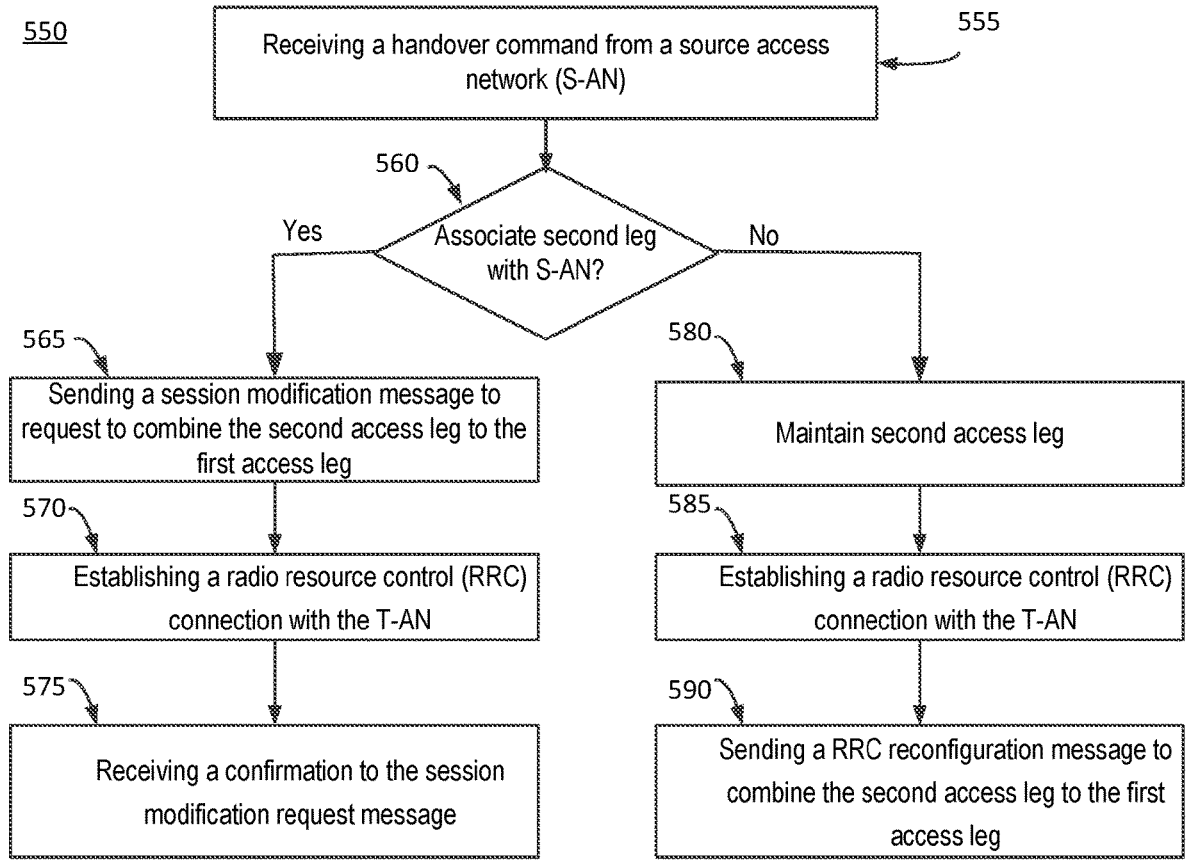
FIG. 5B depicts a flow diagram of an example method of a WTRU.

FIG. 5B is a flow diagram illustrating an example flow 550 directed to managing or otherwise handling mobility (e.g., handover, session continuity, etc.) in connection with PDU sessions. Pursuant to the flow 550 a second access leg of a MA-PDU session may be collapsed onto, combined with, etc. a first access leg of the MA-PDU session. The flow 550 may be carried out by or implemented in a WTRU (or elements thereof, e.g., circuitry including, a transmitter, a receiver, a processor, and memory).

Referring to FIG. 5B, the WTRU may receive, from a S-AN, a handover command in connection with a handover involving a MA-PDU session (ref. 555). The S-AN may be, for example a S-RAN, such as a 3GPP S-RAN. The MA-PDU session may include a first access leg that is associated with the S-AN, and a second access leg that is not associated with the S-AN. The second access leg may be associated with another AN, such as a non-3GPP AN.

The WTRU may determines whether to associate the second access leg to the S-AN for the handover (ref. 560). In an example the determination of whether to associate the second access leg to the S-AN may be, or be part of, a determination of whether to request, or instruct, and/or cause modification of the MA-PDU session to combine the first and second access legs into a combined access leg for the handover. In some instances, the determination action (ref. 560) to associate the second access leg with the S-AN, before the handover is fully executed, may flow directly to the sending of a modification message (ref. 565) via the "yes" path of the determination outcome. Alternative "no" path action options may be available other than that shown in FIG. 5B, such as, but not limited to, taking no action to affect the handover and/or performing some other function.

On a condition that the determination is associate the second access leg to the S-AN for the handover, the WTRU may send a session modification message to request/instruct/cause modification of the MA-PDU session to combine/collapse the first and second access legs into a combined access leg for the handover (ref. 565). In an example the session modification message may indicate, or include information indicating or information including, any of one or more of identifiers, such as session identifiers, for or of the MA-PDU session, a requested action, and a direction of association change/switch. In an example, the session modification message may include information indicating any of an IP tuple for a data flow of the second access leg, a packet filter for a data flow of the second access leg, and a QFI of a data flow of the second access leg.

The WTRU may establish a RRC connection with a T-AN, wherein the combined access leg is associated with the T-AN. (ref. 570). An example T-AN is a target radio access network (T-RAN). The WTRU may receive a confirmation to the session modification message (ref. 575). The WTRU may receive, via the T-AN, traffic of the combined access leg following handover completion. The traffic of the combined access may include traffic buffered at the S-AN during handover and/or traffic resulting from a redirection of traffic from the second access leg to the first access leg made by a (e.g., core) network entity (e.g., in response to the SM message (ref. 565)).

Returning to ref. 560, the WTRU, on condition that the determination is not to associate the second leg to the S-AN for the handover, may exercise the ref. 580, 585, and 590 functions (e.g., as follows). The second leg of the MA-PDU session may be maintained at ref. 580. The WTRU may establish a RRC connection with a T-AN, wherein the first access leg is associated with the T-AN (ref. 585). The WTRU may send, to the T-AN, an RRC reconfiguration message to request/instruct/cause modification of the MA-PDU session to combine the second access leg with the first access leg into a combined access leg associated with the T-AN. Although ref. 580, 585, and 590 are not depicted in FIG. 5A, the flow 550 may be flexible in bringing over traffic associated with the second access leg (e.g. a non-3GPP AN traffic) to the T-AN. Although FIG. 5A is an example message diagram for a switching all traffic of a MA-PDU session to one access during a handover, a partial switching of traffic is also contemplated. In a flexible procedure, a WTRU assisted path switch may be implemented. For example, a WTRU may determine whether the data traffic on the 3GPP AN (e.g., only) will be subject to handover procedure, or whether the data traffic on the non-3GPP AN will also be impacted by the handover. The WTRU may determine it wants all the traffic (including those previously on the non-3GPP access) of the multi-access PDU session to be switched to the target AN, such as a T-RAN. This may be referred to as a complete path switch. The WTRU may determine it wants (e.g., only) part of the traffic (e.g., only those previously on the 3GPP access) to be switched to the target AN. This may be referred to as a partial path switch. The WTRU may indicate to the target AN its determination for a complete path switch or a partial path switch.

If the WTRU has detected that the data transmission over the non-3GPP access is deteriorating during the handover, the WTRU may desire a complete path switch. If the WTRU has detected that the data transmission over the non-3GPP access is not deteriorating during the handover, the WTRU may desire a partial path switch. The WTRU may (e.g., may also) have a local configuration of policies which may indicate a preference between complete path switch or partial path switch for multi-access PDU sessions.

A WTRU may access the target AN after handover. The WTRU may indicate in an RRC message (e.g., RRC Connection Setup Complete, or RRC Reconfiguration Complete) that (e.g., either) a complete path switch or a partial path switch is desired. The WTRU may (e.g., may also) include the PDU Session ID for which the partial or complete path switch is desired. The target RAN may include a partial path switch indication or a complete path switch indication, together with the associated PDU Session IDs, in the path switch request sent to the network. The omission of such an indication could result in a default, for example complete path switch.

In an example, the target AN may indicate a "partial path switch" indication in the path switch request. The network (e.g., Session Manage Function) may, for the multi-access PDU session(s), instruct the UPF to switch the traffic that was previously on 3GPP access to the target RAN. For example, the SMF may include the Tunnel Info of the S-AN in the switch request sent to the UPF to indicate that (e.g., only) the traffic previously going to the S-AN needs to be switched.

In an example, the target AN may indicate a "complete path switch" indication in the path switch request. The network (e.g., Session Manage Function) may, for the multi-access PDU session(s), instruct the UPF to switch all the traffic to the target AN. For example, the SMF may include the Tunnel Info of both the source AN and the Non-3GPP Interworking Function (N3IWF) in the switch request sent to the UPF to indicate that both the traffic previously going to the S-AN and the N3IWF may be switched. In a complete path switch, the SMF may request the target AN to make additional radio configurations (e.g., DRB configuration) for the additional data flows or QoS flows switched from the non-3GPP access. The SMF may include such a request in a Nsmf_PDUSession_UpdateSMContextResponse to the AMF which may pass the request to the target AN in a N2 Path Switch ACK message.

Figure 6A:
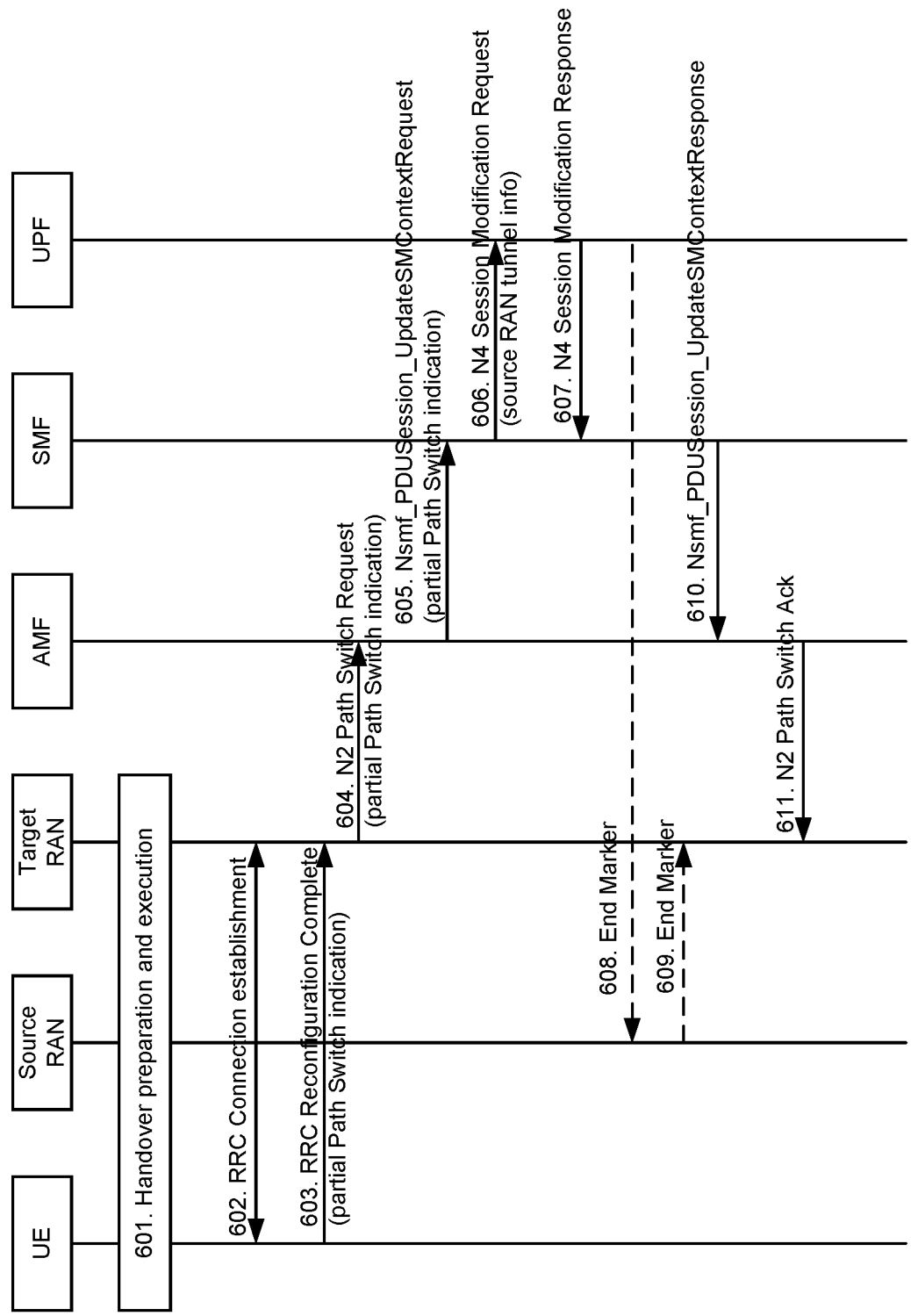
FIG. 6A depicts an example of a WTRU-assisted partial path switch.

FIG. 6A depicts an example of a WTRU-assisted partial path switch. Although FIG. 6A specifically exemplifies a decision to implement a partial path switch, the procedure is also applicable to a complete path switch as indicated below. In FIG. 6A, an Xn-based handover may be triggered. Handover preparation and execution may be performed between the S-AN, the target AN (T-AN), and the WTRU, (ref. 601).

The WTRU and the target RAN may establish the RRC Connection with message at ref. 602 of FIG. 6A. In FIG. 6A the WTRU may indicate in an RRC message (e.g., RRC Reconfiguration Complete) that a partial path switch (or a complete path switch) is desired (ref. 603). Thus, the RRC Reconfiguration Complete message from the WTRU may be used to indicate either a "partial path switch" as indicted in FIG. 6A ref. 603 or may be used to indicate a "complete path switch". FIG. 6A depicts the details of a partial path switch messaging, but a complete path switch would be similar. The target AN may initiate a N2 Path Switch request towards the AMF (ref. 604).

The AMF may invoke the SMF service at ref 605 to switch the DL traffic to the target RAN. For example, the SMF may include the Tunnel Info of the source RAN in the switch request sent to the UPF at ref 606. For example, the SMF and UPF may modify the N4 session at ref 607. The UPF may indicate an end marker to the S-AN to indicate the end of the use of the source RAN (ref. 608). The source RAN may indicate the end marker to the Target AN (ref 609). The SMF may include a request in a Nsmf_PDUSession_UpdateSMContextResponse to the AMF at ref 610 which may pass the request to the target RAN in a N2 Path Switch ACK message at ref 611. As in FIG. 5A, reference item 517, but not shown in FIG. 6A, the WTRU of FIG. 6A may receive a confirmation to the MA-PDU session modification command message send in the handover preparation of ref 601. As in FIG. 5A, the PDU Session Modification response command message (FIG. 5A, reference item 517) may serve as a confirmation to the PDU session modification request message sent as part of the handover preparation and execution of FIG. 6A ref 601.

Figure 6B:
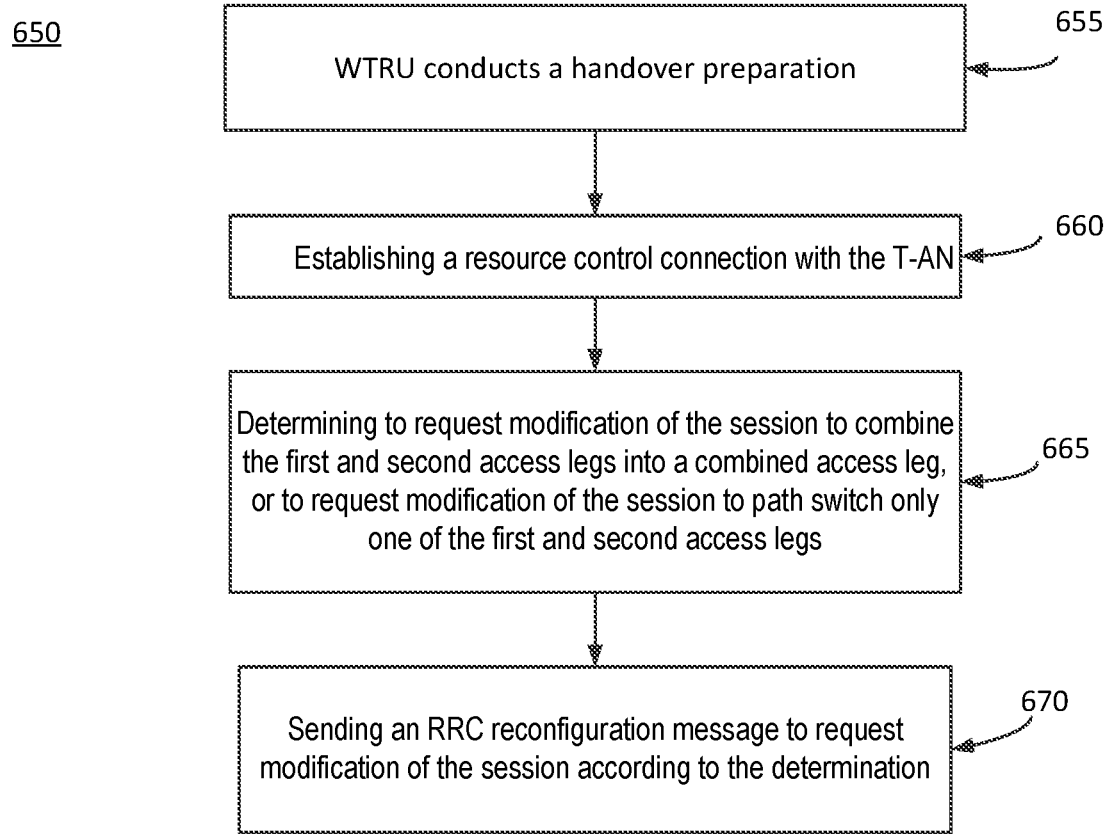
FIG. 6B depicts a flow diagram of an example method of a WTRU.

FIG. 6B is a flow diagram for an example method 650 to conduct a partial or a complete handover of a MA-PDU session from a S-AN to a T-AN. An example S-AN is a source radio access network (S-RAN) and an example T-AN is a target radio access network (T-RAN). The method of 650 may be performed by a WTRU or other similar device that is transitioning from a S-AN to a T-AN. The WTRU may include circuitry having a transmitter, a receiver, a processor and memory to assist in the performance of the method of FIG. 6B.

A handover preparation is conducted (ref. 655). The WTRU establishes a RRC connection with a T-AN in connection with preparation and execution of a handover (ref. 660). The handover involves a MA-PDU session, wherein the MA-PDU session comprises first and second access legs, wherein the first access leg is associated with the T-AN, and wherein the second access leg is not associated with the T-AN.

The WTRU may determine (ref. 665) (e.g., whether) to request/instruct/cause modification of the MA-PDU session to combine the first and second access legs into a combined access leg. Alternatively, the WTRU may determine (e.g., whether) to request/instruct/cause modification of the MA-PDU session to path switch only one of the first access leg or the second access leg. There may be one or more MA-PDU sessions servicing the WTRU. The WTRU may also have one or more single access PDU (SA-PDU) sessions that are to be handed over from a S-AN to a T-AN. A MA-PDU may include data flows on a first access leg and a second access leg. One example of a first access leg is a 3GPP access leg. One example of a second access leg is a non-3GPP access leg.

The WTRU may send (e.g., based on the determination) an RRC reconfiguration message to request, or instruct, and/or cause modification of the MA-PDU session to combine the second access leg with the first access leg (ref. 670). Alternatively, the RRC reconfiguration message may be sent to request, or instruct, and/or cause modification of the MA-PDU session to path switch only one of the first and second access legs (ref 670). The RRC reconfiguration message may indicate a complete path switch of the first access leg and the second access leg of the MA-PDU session to the T-AN. Alternately, the RRC reconfiguration message may indicate a partial path switch of only one of the first access leg or the second access leg to the T-AN. It is noted that the complete path switch or the partial path switch (which is shown in FIG. 6B) is determined after the WTRU has connected to the T-AN.

In another embodiment, procedures may be implemented by a WTRU, a RAN node (e.g., gNB, eNB, non-3GPP access RAN), and/or a CN node (e.g., AMF, UPF, N3IWF, etc.) for a N2-based handover with AMF relocation. In an example, a source AMF (S-AMF) may receive a Handover Required message from a source RAN. The S-AMF may determine that there is one or more active multi-access PDU sessions for the WTRU. The S-AMF may provide additional information to the selected T-AMF (e.g., in a Namf_Communication_CreateUEContextRequest). For example, the S-AMF may indicate (e.g., in the PDU Session List to be handed over) which PDU sessions are multi-access PDU sessions. For example, the S-AMF may indicate information about the WTRU's non-3GPP access connection (e.g., N3IWF identifier, Security Parameter Index of the main Internet Key Association (IKE) Security Association, transport address of the N3IWF, the PDU Session List, such as the PDU session IDs, on the non-3GPP access, etc.). For example, the S-AMF may indicate information about how traffic flows (e.g., QoS flows) may be distributed between 3GPP access and non-3GPP access for the involved multi-access PDU sessions (e.g., the S-AMF may require this information from the S-SMF before it may pass it to the T-AMF and target SMF).

In an example, information (e.g., from the S-AMF) may be used by the T-AMF for selecting a target SMF (T-SMF) that may handle the multi-access PDU sessions and/or used by the T-SMF for selecting new intermediate UPFs (I-UPF) that may connect the N3IWF (e.g., if I-UPF relocation is needed).

If the WTRU has active multi-access PDU sessions, the S-AMF may (e.g., may also) inform the S-SMF that a N2 handover may occur for the WTRU. The S-TMF may (e.g., based on this notification) consider changing the multi-access PDU sessions to (e.g., normal) single-access PDU sessions (e.g., by initiating a PDU Session Modification procedure).

In an example of changing the multi-access PDU sessions to single-access PDU sessions, the S-SMF may decide to turn the multi-access PDU session into a single-access PDU session on the non-3GPP access and switch (e.g., all) the traffic to the non-3GPP access. For example, this PDU session may not be considered as one of the PDU sessions to be handed-over to the new 3GPP RAN.

In another example of changing the multi-access PDU sessions to single-access PDU sessions, the S-SMF may decide to turn the multi-access PDU session into a single-access PDU session on the 3GPP access and switch (e.g., all) the traffic to the 3GPP access. For example, this PDU session may be considered as one of the PDU sessions to be handed-over to the new 3GPP RAN.

A multi-access PDU session modification (e.g., into single-access PDU session) may be performed prior to or during a handover preparation procedure (e.g., so the target AMF and target SMF will get the correct PDU Session List to be handed-over and/or proper resource reservation may be made at the target RAN). The S-SMF may (e.g., may also) return the traffic distribution information to the S-AMF upon receiving the notification that the N2 handover will occur. An N2 connection switch for the N3IWF may be performed.

In an example, a S-AMF triggered N2 connection switch may be provided. An S-AMF may receive confirmation from the T-AMF that the handover preparation is successful and the WTRU context has been established in the T-AMF. The S-AMF may send a N2 switch message (e.g., Handover Request or AMF Mobility Request) to the N3IWF and may provide the identifier and the transport address of the new T-AMF. The S-SMF may (e.g., may also) indicate in the N2 switch message the reason for the N2 switch (e.g., 3GPP handover). The N3IWF may initiate NG Application Protocol (NGAP) WTRU association towards the new AMF.

In another example, a T-AMF triggered N2 connection switch may be provided. At a time (e.g., determined by the T-AMF), for example, such as after the WTRU has connected the target RAN, the T-AMF may send a N2 switch message (e.g., Handover Request or AMF Mobility Request) to the N3IWF and may provide the identifier and the transport address of the new T-AMF. The N3IWF may initiate NGAP WTRU association towards the new AMF.

In yet another example, a registration procedure triggered N2 connection switch may be provided. The N2 connection switch may be triggered by the registration procedure. After handover (e.g., after completion of handover) to the T-AMF, the WTRU may initiate a registration procedure over the 3GPP access. The T-AMF may send a registration accept message including an indication (e.g., explicit indication) to indicate that the WTRU should perform an additional registration procedure over the non-3GPP access with the newly assigned 5G-globally unique temporary identity (5G-GUTI). The WTRU may initiate a second registration procedure over a non-3GPP access with the new 5G-GUTI. The second registration procedure initiated by the WTRU may cause the N3IWF to switch (e.g., relocate) the N2 connection to the T-AMF.

Alternatively, if a WTRU has a MA-PDU session and it receives a new temp ID (e.g. 5G-GUTI) in the registration accept message over 3GPP access, the WTRU may perform a subsequent registration procedure over the non-3GPP access to ensure that N3IWF connects to the T-AMF.

In the above-described methods of N2 connection switch for the N3IWF, the AMF that initiates the N2 switch may (e.g., may also) provide the Security Parameter Indexes (SPI) of the corresponding IKE SA in the switch request (e.g., so the N3IWF may identify which WTRU the N2 connection switch request is associated with).

The N3IWF may establish N2 connection with a new AMF. The N3IWF may send an initial N2 message (e.g., Handover Confirm) towards the new T-AMF. The initial N2 message may include a temporary identifier with the old S-AMF (e.g., 5G-S-TMSI), the identifier of the old S-AMF (e.g., Globally Unique AMF ID (GUAMI)), the PDU Session List, etc.

A WTRU may be handed-over to the target 3GPP RAN. The WTRU may perform a procedure on the non-3GPP access. For example, the WTRU may perform a registration procedure (e.g., using the new temporary WTRU identifier received over 3GPP access from the new AMF). The WTRU may send the new WTRU temporary identifier (e.g., 5G-GUTI or 5G-S-TMSI), for example, in the AN Parameters associated with a NAS Registration request. The WTRU may (e.g., may also) send a corresponding old WTRU temporary identifier (e.g., in the AN Parameters associated with a NAS Registration request).

During a N2-based handover, e.g., before the WTRU is fully connected with the target RAN, traffic (e.g., data) that originally goes to the source RAN may (e.g., may need to) be forwarded to the target RAN. The forwarding may be carried out using "direct forwarding" (e.g. from the source RAN directly to the target RAN via Xn). Alternatively, the forwarding may be carried out using "indirect forwarding" (e.g. from the source RAN to the intermediate UPF which then forwards the data to the target RAN). For a MA-PDU session, e.g., when a data flow is split between two accesses, such as a 3GPP access and a non-3GPP access, the forwarding, whether direct or indirect, may introduce delay (e.g., at the 3GPP access side) and/or may exacerbate timing variance of data arrival between two accesses.

In one example, the interworking function interfacing with the non-3GPP access of the MA-PDU session (e.g. an N3IWF), may remain unchanged during a N2-based handover and a transport channel for the MA-PDU session may be readily available through the N3IWF. The "to-be-forwarded" traffic may be temporarily offloaded (e.g., diverted) through the N3IWF and the traffic forwarding via Xn or I-UPF may be skipped. Since the non-3GPP access is available for the WTRU, the UP path via N3IWF can be utilized for temporary offloading (e.g., diversion) of traffic of a normal single-access PDU session.

Compared to the traditional direct or indirect forwarding, traffic offloading (e.g., diversion) via an interworking function, such as a N3IWF, during handover may have the following benefits. One; the traffic offloading (e.g., diversion) via the interworking function may be started at an early stage of the handover, which may avoid data loss due to radio condition deterioration at the source RAN. Two; the delay introduced by forwarding, including delays associated with buffering of the traffic at the source RAN and/or target RAN, may be minimized or averted given that the interworking function (e.g., N3IWF) remains unchanged during the handover, and hence, the UP path via the N3IWF is not affected by the handover and available for use.

Figure 7A:
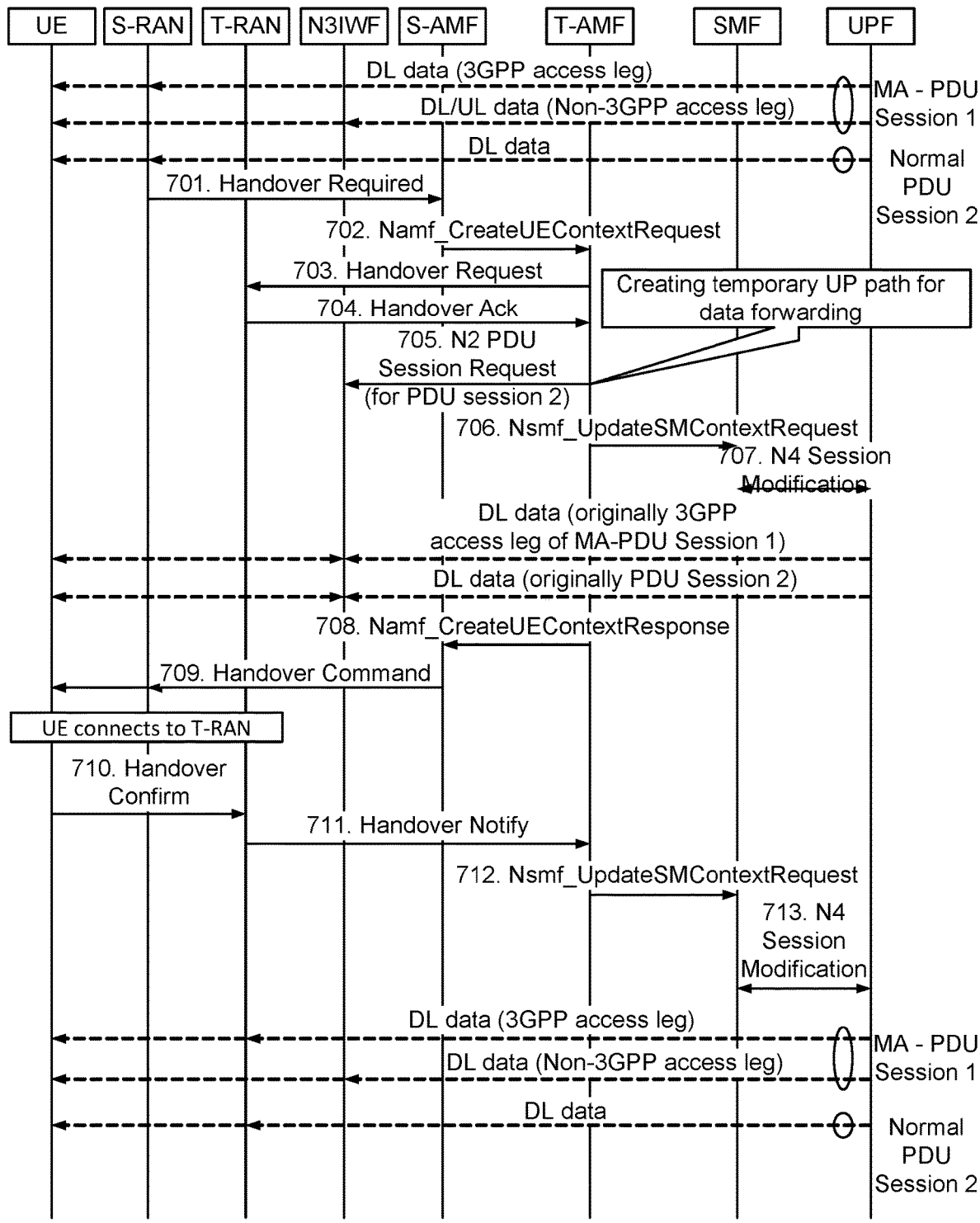
FIG. 7A is a flow diagram illustrating a representative procedure in which a handover involving a multi-access PDU session and a single-access PDU session is carried out.

FIG. 7A is a flow diagram illustrating a representative procedure in which a handover involving a MA-PDU session and a SA-PDU session is carried out. As shown in FIG. 7A, a WTRU may have a MA-PDU session 1 and a normal single-access PDU session 2. The MA-PDU session 1 may include first and second first legs. Pursuant to the procedure, traffic may be (e.g., temporarily) offloaded or diverted to avoid traffic forwarding during and/or in connection with handover of the first leg of the MA-PDU session and the normal single-access PDU session from a S-AN to a T-AN. The second leg of the MA-PDU session may be served by an access other than the S-AN. For convenience, in FIG. 7A and the description that follows, the S-AN and T-AN may be referred to as 3GPP ANs, the access serving the second leg of the MA-PDU session 1 may be referred to as a non-3GPP access (or non-3GPP AN). The non-3GPP access may be or include an interworking function (shown as an N3IFW), the first leg of the MA-PDU session 1 is referred to as a "3GPP access leg" and the second leg of the MA-PDU session 1 is referred to in FIG. 7A as a "non-3GPP access leg".

A handover message may be sent from the S-AN to a source access and mobility management function (S-AMF) (ref. 701). A network service request may be sent from the S-AMF to a target access and mobility management function (T-AMF) to request handover preparation at the T-AMF (ref. 702). The T-AMF may receive the network service request from the S-AMF (ref. 702). The T-AMF may extract PDU session information from the network service request. The PDU session information may indicate and/or include information associated with an access serving the second leg of the MA-PDU session. The access serving the second leg of the MA-PDU session may be an access other than the S-AN ("second-leg access" as above).

The T-AMF may send a handover request to the T-AN (ref. 703). The T-AN may receive the handover request (ref. 703). The T-AN may send a handover acknowledgement to T-AMF (ref. 704). The T-AMF may receive the handover acknowledgement (ref. 704).

The T-AMF may determine the WTRU may be configured to use and/or may be using the non-3GPP access for the second leg of the MA-PDU session. The T-AMF may decide that such non-3GPP access is to be used for the temporary offload or diversion of traffic on the first leg of the MA-PDU session and the normal single-access PDU session that would otherwise pass to the S-AN, to the T-AN, if forwarded. The T-AMF may send to the interworking function a request (e.g., an N2 PDU Session Request) to create a temporary PDU session for the normal, single-access PDU Session 2 (ref. 705). The interworking function may establish Internet Protocol Security (IPSec) Security Association (SA) with the WTRU for the normal, single-access PDU Session 2. A second temporary PDU session need not be created for the first leg of the MA-PDU Session 1 in view of already having a User Plane (UP) path available through the interworking function, namely, the second leg of the MA-PDU Session 1. The T-AMF may send, to a SMF, a first session modification request to cause modification of session management contexts associated with the single-access PDU session and the first leg of the MA-PDU session utilizing context information associated with the temporary PDU session and the second leg of the MA-PDU session, respectively (ref. 706). The SMF may receive the first session modification request (ref. 706).

The SMF and a UPF may perform a procedure to carry out a first session modification in accordance with or based on the first session modification request (ref. 7). Pursuant to such procedure, the UPF may (e.g., temporarily) offload or divert traffic of the first leg MA-PDU session 1 and the normal single-access PDU session 2 that would otherwise be passed to the 3GPP access to the non-3GPP access (N3IWF). The traffic of the first leg MA-PDU session 1 that would otherwise be passed to the 3GPP access may traverse the second leg of the MA-PDU session 1, and the traffic of the normal single-access PDU session 2 that would otherwise be passed to the 3GPP access may traverse the temporary PDU session (e.g., as shown by the dotted lines below ref. 707). A result of such offloading/diversion is that traffic forwarding for the handover from the S-AN to the T-AN is minimized or averted due to the traffic of first leg of the MA-PDU session and the single-access PDU session not passing to the S-AN.

A result of such offloading/diversion is that traffic forwarding for the handover from the S-AN to the T-AN is minimized or averted due to the traffic of first leg of the MA-PDU session and the single-access PDU session not passing to the S-AN.

The T-AMF may notify the S-AMF that the access resource is ready at the target to accommodate the WTRU (ref. 708). The S-AMF may ask the WTRU, e.g., using a handover command, to start accessing the T-AN (ref. 709). The WTRU may connect to the T-AN. The WTRU may send a handover confirmation to the T-AN (ref. 710). The T-AN may receive the handover confirmation (ref. 710), and may send a handover notification to the T-AMF (ref. 711). The handover notification may indicate the single-access PDU session and the first leg of the MA-PDU session are handed over to the T-AN. In an embodiment, the handover notification may include or be separate notifications for the single-access PDU session and the first leg of the MA-PDU session. The separate notifications may be sent and/or received at different instances in time.

Stated another way, in an embodiment, after the T-AMF is informed that the WTRU has connected to the T-AN, the T-AMF may communicate with the SMF to cause modification of the MA-PDU session 1 and the normal single-access PDU session 2 such that traffic that would otherwise be diverted to the non-3GPP access now is carried via the first leg of the MA-PDU session, and the single-access PDU session may become re-established in the T-AN.

The T-AMF may initiate a release of the temporary PDU session (ref. 712). A session release request may be sent from the SMF to the N3IWF (e.g., via T-AMF) (ref. 713). Other release mechanisms for the temporary PDU session may be used as well.

Figure 7B:
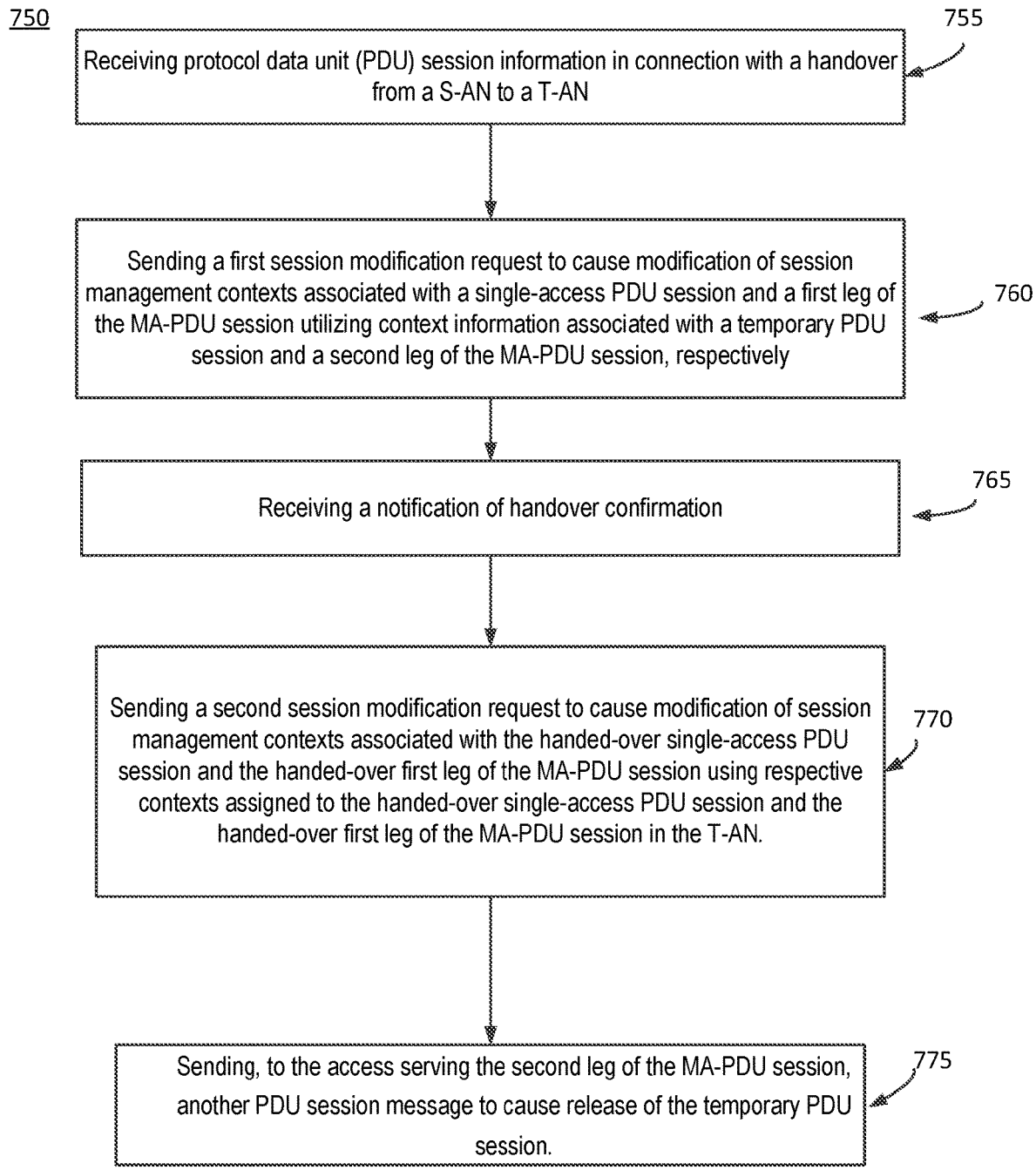
FIG. 7B depicts a flow diagram of an example method of a T-AMF.

FIG. 7B is an flow diagram for an example method 750 to conduct a handover of a MA-PDU session from a S-AN to a T-AN. An example S-AN is a source radio access network (S-RAN) and an example T-AN is a target radio access network (T-RAN). The method of 700 may be performed by a target access and mobility management function (T-AMF) or other similar network core function that supports a device, such as a WTRU, that is being handed-over from a S-AN to a T-AN.

The T-AMF receives (ref. 755), from a source access and mobility management function (S-AMF), PDU session information in connection with the handover of any of a single-access PDU session and a first leg of a multi-access PDU (MA-PDU) session. The PDU session information indicates information associated with an access serving a second leg of the MA-PDU session, wherein the second leg of the MA-PDU session does not utilize the S-AN. In one example, the second leg of the MA-PDU session may utilize a non-3GPP access. The first leg of the MA-PDU session may utilize a 3GPP access. Ref. 755 can may include receiving a transport address associated with the access serving the second leg of the MA-PDU session. Ref. 755 may also include receiving the PDU session information that indicates information associated with a non-Third Generation Partnership Project (non-3GPP) access having an associated interworking function (N3IWF).

The T-AMF (ref. 760) sends, to a SMF, a first session modification request to cause modification of session management contexts associated with the single-access PDU session and the first leg of the MA-PDU session utilizing context information associated with a temporary PDU session and the second leg of the MA-PDU session, respectively. Optionally, the T-AMF may send, to the access serving the second leg of the MA-PDU session, a PDU session message to cause creation of the temporary PDU session as a proxy for the single-access PDU session. Alternate to this option, the temporary PDU session may already be created or a suitable substitute for a temporary PDU session may already be in existence. In one example, the temporary PDU session may be a non-3GPP session associated with the second leg of the MA-PDU session.

The first session management message (ref. 760) may be a result of a determination based at least in part on the PDU session information, where the T-AMF may seek to cause traffic associated with the first leg of the MA-PDU session to traverse the second leg of the MA-PDU session, and traffic associated with the single-access PDU session to traverse the temporary PDU session established at an access serving the second leg of the MA-PDU session. Alternately, the first session management message (ref 760) may be a result of a determination based at least in part on the PDU session information, where the T-AMF may seek to cause traffic associated with the first leg of the MA-PDU session to traverse the T-AN instead of the second leg of the MA-PDU session, and traffic associated with the single-access PDU session to traverse the T-AN instead of the temporary PDU session. Either determination can be made as a result of the PDU session information. Sending a session modification request (ref. 710) may also include wherein sending, to a SMF, a transport address associated with the access serving the second leg of the MA-PDU session.

The T-AMF receives (ref. 756) a notification of handover confirmation from the S-AN to the T-AN. The T-AMF sends (ref. 770) to the SMF, a second session modification request to cause modification of session management contexts associated with the handed-over single-access PDU session and the handed-over first leg of the MA-PDU session using respective contexts assigned to the handed-over single-access PDU session and the handed-over first leg of the MA-PDU session in the T-AN. The TMF may also include sending (ref 770), to the SMF, a transport address associated with the T-AN.

After sending the session modification request message (ref 770), the procedure 750 may complete. However, The T-AMF may send (ref 775), to the access serving the second leg of the MA-PDU session, another PDU session message to cause release of the temporary PDU session.

Example method 750 may also include receiving information for triggering the sending of the first session modification request. The information for triggering the sending of the first session modification request may include receiving an acknowledgement of handover request from the T-AN. The T-AMF may send a handover request to transfer the MA-PDU session and the single-access PDU session from the S-AN to the T-AN before receiving the acknowledgement of the handover request.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media may include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed:

1. A wireless transmit/receive unit (WTRU) comprising circuitry, including a transmitter, a receiver, a processor, and memory, configured to:
   receive, from a source access network (S-AN) a command for a handover involving a multi-access protocol data unit (MA-PDU) session, wherein the MA-PDU session comprises first and second data flows, wherein the first data flow is associated with the S-AN, and wherein the second data flow is associated with an access network other than the S-AN;
   determine whether to switch the second data flow to the S-AN for the handover;
   on condition that the determination is to switch the second data flow to the S-AN for the handover, send a session modification message to request modification of the MA-PDU session to combine the first and second data flows to the S-AN for the handover; and
   establish a radio resource control (RRC) connection with a target access network (T-AN) wherein the WTRU executes the handover of the first data flow and the second data flow to the T-AN.

2. The WTRU of claim 1, further configured to:
   receive, via the T-AN, traffic comprising the first data flow and the second data flow.

3. The WTRU of claim 1, wherein the session modification message indicates any of one or more identifiers for the MA-PDU session, a requested action, and a direction of association change.

4. The WTRU of claim 1, wherein the session modification message comprises information indicating any of an internet protocol tuple for the second data flow, a packet filter for the second data flow, and a quality of service flow identifier of the second data flow.

5. The WTRU of claim 1, wherein the circuitry is further configured to receive a confirmation to the session modification message.

6. The WTRU of claim 1, wherein the circuitry is further configured to receive, via the T-AN, traffic previously buffered by the S-AN.

7. A method to handover a multi-access protocol data unit (MA-PDU) session, the method comprising:
   receiving, from a source access network (S-AN) a command for a handover, wherein the MA-PDU session comprises first and second data flows, wherein the first data flow is associated with the S-AN, and wherein the second data flow is associated with an access network other than the S-AN;
   determining whether to switch the second data flow to the S-AN for the handover;
   on condition that the determination is to switch the second data flow to the S-AN for the handover, sending a session modification message to request modification of the MA-PDU session to combine the first and second data flows to the S-AN for the handover; and
   establishing a radio resource control (RRC) connection with a target access network (T-AN) wherein a wireless transmit/receive (WTRU) executes the handover of the first data flow and the second data flow to the T-AN.

8. The method of claim 7, further comprising:
   receiving, via the T-AN, traffic comprising the first data flow and the second data flow.

9. The method of claim 7, wherein sending a session modification message comprises sending a session modification message that indicates any of: one or more identifiers for the MA-PDU session, a requested action, and a direction of association change.

10. The method of claim 7, wherein sending a session modification message comprises sending the session modification message containing an indication of any of: an internet protocol tuple for the second data flow, a packet filter for the second data flow, and a quality of service flow identifier of the second data flow.

11. The method of claim 7, further comprising:
    receiving a confirmation to the session modification message.

12. The method of claim 7, further comprising:
    receiving, via the T-AN, traffic previously buffered by the S-AN.

13. A wireless transmit/receive unit (WTRU) comprising circuitry, including a transmitter, a receiver, a processor, and memory, configured to:
    receive, from a source access network (S-AN) a command for a handover involving a multi-access protocol data unit (MA-PDU) session, wherein the MA-PDU session comprises first and second data flows, wherein the first data flow is associated with the S-AN, and wherein the second data flow is associated with an access network other than the S-AN;
    determine whether to switch the second data flow to the S-AN for the handover;
    on condition that the determination is not to switch the second data flow to the S-AN for the handover, the circuitry is configured to:
    maintain the second data flow;
    establish a radio resource control (RRC) connection with a T-AN, wherein the first data flow is switched to the T-AN; and
    send, to the T-AN, an RRC reconfiguration message to request modification of the MA-PDU session to combine the second data flow with the first data flow to the T-AN.

14. The WTRU of claim 13, further configured to:
receive, via the T-AN, traffic comprising the first data flow and the second data flow.

15. The WTRU of claim 13, wherein the RRC reconfiguration message to request for modification of the MA-PDU session indicates one or more identifiers for the MA-PDU session.

16. The WTRU of claim 13, wherein the circuity is further configured to receive a confirmation to the RRC reconfiguration message.

17. The WTRU of claim 13, wherein the circuitry is further configured to receive, via the T-AN, traffic previously buffered by the S-AN.

* * * * *